United States Patent [19]

Springer et al.

[11] Patent Number: 4,785,099

[45] Date of Patent: Nov. 15, 1988

[54] WATER-SOLUBLE TRIPHENDIOXAZINE COMPOUNDS

[75] Inventors: Hartmut Springer, Königstein; Günther Schwaiger, Frankfurt am Main; Walter Helmling, Hofheim am Taunus, all of Fed. Rep. of Germany

[73] Assignee: Hoechst Aktiengesellschaft, Frankfurt am Main, Fed. Rep. of Germany

[21] Appl. No.: 943,643

[22] Filed: Dec. 17, 1986

[30] Foreign Application Priority Data

Dec. 19, 1985 [DE] Fed. Rep. of Germany ....... 3544982

[51] Int. Cl.$^4$ .................. C07D 265/38; C09B 19/02
[52] U.S. Cl. ...................................... 544/76; 544/75; 544/77; 564/367
[58] Field of Search ............................ 544/75, 76, 77

[56] References Cited

U.S. PATENT DOCUMENTS 4,621,138 11/1986 Jäger et al. ............................ 544/76
4,665,179 5/1987 Wunderlich et al. .................. 544/76

FOREIGN PATENT DOCUMENTS 0101665 2/1984 European Pat. Off. .
60-18359 5/1985 Japan .
1368158 9/1974 United Kingdom .

Primary Examiner—Richard L. Raymond

[57] ABSTRACT

Water-soluble triphendioxazine compounds having fiber-reactive dye properties and the general formula (1)

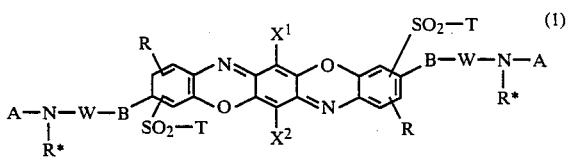

in which the meanings are:

T is a substituted or unsubstituted alkyl of 1 to 6 carbon atoms, except an ethyl which is substituted in the β-position by an alkalinically eliminatable substituent, which alkyl can be interrupted by —O—, —S—, —NH— and —N(R')— where R' is equal to substituted or unsubstituted alkyl of 1 to 6 carbon atoms, or is substituted or unsubstituted aryl, B is —O—, —S—, —NH— or —N(R'')— where R'' is equal to substituted or unsubstituted alkyl, W is a bridge member or W and B together form a direct bond, R is hydrogen or a substituent, R* is hydrogen or a substituent or R* and W, if W contains an amino group, or a portion of W form together with the nitrogen atoms the radical of a heterocycle, A is a non-heterocyclic fiber-reactive group or a 2-halogeno-s-triazin-6-yl radical which is substituted in the 4-position by halogen or a substituted or unsubstituted amino group which can also contain a fiber-reactive group, or by a heterocyclic radical or by a further such halogenotriazinyl radical bonded via an amino radical as bridge member, $X^1$ and $X^2$ are each hydrogen, halogen, cycloalkyl, aralkoxy, alkoxy, aryloxy, alkyl, aryl, aralkyl, cyano, carboxy, carbalkoxy, arylamino, carbamoyl and alkylmono- or -disubstituted carbamoyl or arylcarbamoyl, alkanoylamino or aroylamino, which aryl radicals can in each case be substituted;

of the sulfo and sulfate groups the molecule mandatorily contains at least one of these groups, furthermore precursors of the formulae

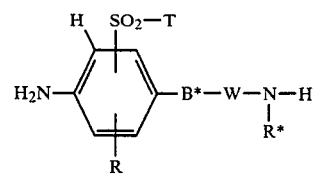

and

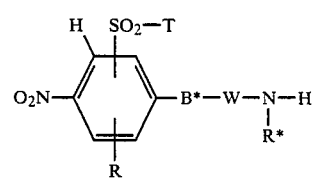

with B* equal to —NH— or —N(R'')— and R, R*, W and T of the abovementioned meanings.

The triphendioxazine compounds serve for dyeing chiefly wool and synthetic polyamide fibers and in particular cellulose fibers by means of application and fixing methods which are customary for fiber-reactive dyes.

7 Claims, No Drawings

WATER-SOLUBLE TRIPHENDIOXAZINE COMPOUNDS

The present invention relates to the field of fiber-reactive dyes.

British Patent No. 1,368,158, Japanese Patent Publication No. Sho-60-18,359 and European Patent Application Publication No. 0,101,665A disclose fiber-reactive triphendioxazine compounds. There was an industrial demand for fiber-reactive triphendioxazine compounds having better dye properties.

We have now found new water-soluble triphendioxazine compounds which conform to the general formula (1)

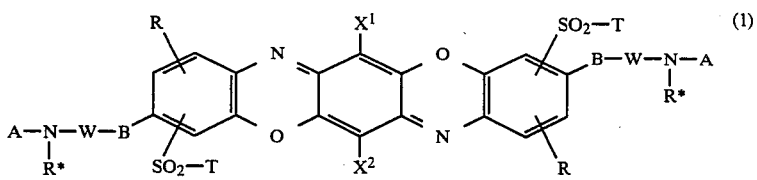

and which have valuable fiber-reactive dye properties.
In this formula (1) the meanings are:

T is a substituted or unsubstituted alkyl group of 1 to 6 carbon atoms, preferably of 1 to 4 carbon atoms, except the ethyl group which is substituted in the $\beta$-position by an alkalinically eliminatable substituent, it being possible for the alkyl group to be additionally interrupted by hetero groups, preferably 1 or 2 hetero groups, which are selected from groups of the formulae —O—, —S—, —NH— and —N(R')—, in which R' is an alkyl group of 1 to 6 carbon atoms, preferably of 1 to 4 carbon atoms, such as, in particular, the methyl or ethyl group, which can be substituted, or T is a substituted or unsubstituted aryl group;

B is an oxygen or sulfur atom or an amino group of the formula —NH— or —N(R")—, in which R" is an alkyl group of 1 to 6 carbon atoms, preferably 1 to 4 carbon atoms, such as, in particular, the methyl or ethyl group, which can be substituted, or B forms together with W a direct bond;

W forms together with B a direct bond or

W is a bridge member, such as, for example, a bivalent, substituted or unsubstituted aliphatic, araliphatic, heterocyclic or aromatic carbocyclic radical, it being possible for the aliphatic radicals in W to be interrupted by hetero groups, preferably 1 or 2 hetero groups, these hetero groups being selected from groups of the formulae —O—, —S—, —SO₂—, —NH—, —N(R°)— and a bivalent heterocyclic radical, in which R° is an alkyl group of 1 to 6 carbon atoms, preferably of 1 to 4 carbon atoms, such as, in particular, the methyl or ethyl group, which can be substituted, and/or it being possible for the aliphatic radicals and the aryl radicals to be linked to one another by such a hetero group;

R is a hydrogen atom or a substituent, such as, for example, an alkyl of 1 to 4 carbon atoms, of which in particular such as methyl and ethyl, which can be substituted, or an alkoxy of 1 to 4 carbon atoms, of which in particular such as methoxy and ethoxy, which can be substituted, or a halogen, such as fluorine and bromine and in particular chlorine;

R* is a hydrogen atom or a substituent, such as, for example, an alkyl group of 1 to 4 carbon atoms, which can be substituted, or a cycloalkyl group of 5 to 8 carbon atoms, or R* and R° together with the two nitrogen atoms and the bivalent radical W or a part of the radical W form the radical of a 5- or 6-membered heterocycle (preferably satured heterocycle);

A is a nonheterocyclic fiber-reactive group, preferably from the aliphatic series, or A is a radical of the general formula (2)

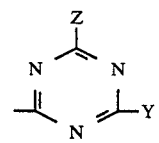

(2)

in which

Z is a fluorine, bromine or chlorine atom, preferably a chlorine atom, and

Y has one of the meanings of Z, of which preferably the same meaning, or is an amino group of the general formula (3a)

(3a)

in which

R¹ is a hydrogen atom or a substituted or unsubstituted alkyl group of 1 to 6 carbon atoms, preferably of 1 to 4 carbon atoms, it being possible for one of these substituents also to be a fiber-reactive group, or R¹ is a cycloalkyl group having 5 to 8 carbon atoms, and R² is a hydrogen atom or an alkyl group of 1 to carbon atoms, preferably of 1 to 4 carbon atoms, it being possible for the alkyl group to be substituted and for one of these substituents also to be a fiber-reactive group, or R² is a cycloalkyl group having 5 to 8 carbon atoms or is an aryl group which can be substituted, it being possible for one or two of these substituents in the aryl radical also to be a fiber-reactive group, or R² is a heterocyclic radical, or R¹ and R² and the N-atom form, optionally with a further N-, S- or O-atom, a heterocyclic, in particular saturated, ring, Y is a group of the formula (3b)

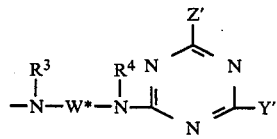

(3b)

in which $R^3$ and $R^4$ each denote a hydrogen atom or an alkyl group of 1 to 4 carbon atoms, such as the methyl or ethyl group, $Z'$ is a fluorine or bromine atom or preferably a chlorine atom, $Y'$ has one of the meanings of Y, except the meaning of a group of the formula (3b), and $W^*$ has one of the meanings of W;

$X^1$ is a hydrogen atom or a halogen atom, such as fluorine, in particular a chlorine or bromine atom, a cycloalkyl group of 5 to 8 carbon atoms, such as the cyclohexyl group, an aralkyloxy group, an alkoxy group of 1 to 4 carbon atoms, such as the methoxy group, an aryloxy group, an alkyl group of 1 to 4 carbon atoms, such as the methyl group, an aryl group, an aralkyl group, a cyano group, a carboxy group, a carbalkoxy group of 2 to 5 carbon atoms, such as the carbomethoxy or carbethoxy group, an arylamino group, a carbamoyl group, an N-alkylcarbamoyl group or N,N-dialkylcarbamoyl group having alkyl radicals of 1 to 4 carbon atoms each, an N-arylcarbamoyl group, an alkanoylamino group of 2 to 5 carbon atoms, such as the acetylamino group, or an aroylamino group, such as the benzoylamino group, the aryl radicals in these groups mentioned preferably being phenyl radicals which can be additionally substituted by 1 or 2 substituents from the group halogen, such as chlorine, nitro, alkyl of 1 to 4 carbon atoms, alkoxy of 1 to 4 carbon atoms, carboxyl and sulfo and $X^1$ preferably being a hydrogen atom, an alkanoylamino group of 2 to 5 carbon atoms, a phenoxy group which can be substituted, an alkoxy group of 1 to 4 carbon atoms, an alkyl group of 1 to 4 carbon atoms and in particular preferably a chlorine atom or bromine atom;

$X^2$ is identical to $X^1$ or different from $X^1$ and has one of the meanings indicated for $X^1$;

group $-SO_2-T$ is preferably bonded in the ortho-position relative to the group $-B-W-N(R^*)-A$;

of the sulfo and sulfato groups which can be present in the molecule (1), the molecule (1) mandatorily contains at least one, preferably at least two.

The individual formula members, including those which appear twice, can have meanings which are identical to or different from one another. Preferably the formula members which appear twice have the same meaning.

Aryl radicals in the groups mentioned above or hereinafter are in particular the phenyl and naphthyl radicals; they can be substituted, for example by substituents from the group alkyl of 1 to 4 carbon atoms, such as methyl and ethyl, alkoxy of 1 to 4 carbon atoms, such as methoxy and ethoxy, halogen, such as chlorine and bromine, sulfo, carboxy, sulfamoyl, carbamoyl, carbamoyl which is monosubstituted or disubstituted by phenyl, alkyl of 1 to 4 carbon atoms, phenylalkyl having an alkyl radical of 1 to 4 carbon atoms and/or cycloalkyl of 5 to 8 carbon atoms, sulfamoyl which is monosubstituted or disubstituted by phenyl, alkyl of 1 to 4 carbon atoms, phenylalkyl having an alkyl radical of 1 to 4 carbon atoms and/or cycloalkyl of 5 to 8 carbon atoms, trifluoromethyl, alkanoylamino of 2 to 5 carbon atoms, nitro, amino and optionally monosubstituted or disubstituted amino, the substituents of which are substituted or unsubstituted aliphatic (including araliphatic), substituted or unsubstituted aryl and ($C_5$–$C_8$)-cycloalkyl radicals.

Aryl radicals in the araliphatic radicals are in particular phenylene and naphthylene radicals; they can be substituted, for example by substituents selected from alkyl of 1 to 4 carbon atoms, such as methyl and ethyl, alkoxy of 1 to 4 carbon atoms, such as methoxy and ethoxy, halogen, such as chlorine and bromine, sulfo, carboxy, sulfamoyl, carbamoyl, carbamoyl which is monosubstituted or disubstituted by phenyl, alkyl of 1 to 4 carbon atoms, phenylalkyl having an alkyl radical of 1 to 4 carbon atoms and/or cycloalkyl of 5 to 8 carbon atoms, sulfanoyl which is monosubstituted to disubstituted by phenyl, alkyl of 1 to 4 carbon atoms, phenylalkyl having an alkyl radical of 1 to 4 carbon atoms and/or cycloalkyl of 5 to 8 carbon atoms, trifluoromethyl, alkanoylamino of 2 to 5 carbon atoms, nitro, amino and optionally monosubstituted or disubstituted amino, the substituents of which being substituted or unsubstituted aliphatic (including araliphatic), substituted or unsubstituted aryl and ($C_5$–$C_8$)-cycloalkyl radicals.

Aromatic carbocyclic radicals are for example phenylene and naphthylene on the one hand and phenyl and napthyl radicals on the other, which can be substituted, for example by substituents selected from alkyl of 1 to 4 carbon atoms, such as methyl and ethyl, alkoxy of 1 to 4 carbon atoms, such as methoxy and ethoxy, halogen, such as chlorine and bromine, sulfo, carboxy, sulfamoyl, carbamoyl, carbamoyl which is monosubstituted or disubstituted by phenyl, alkyl of 1 to 4 carbon atoms, phenylalkyl having an alkyl radical of 1 to 4 carbon atoms and/or cycloalkyl of 5 to 8 carbon atoms, sulfamoyl which is monosubstituted or disubstituted by phenyl, alkyl of 1 to 4 carbon atoms, phenylalkyl having an alkyl radical of 1 to 4 carbon atoms and/or cycloalkyl of 5 to 8 carbon atoms, trifluoromethyl, alkanoylamino of 2 to 5 carbon atoms, nitro, amino and optionally monosubstituted or disubstituted amino, the substituents of which being substituted or unsubstituted aliphatic (including araliphatic), substituted or unsubstituted aryl and ($C_5$–$C_8$)-cycloalkyl radicals. Of these, preference is given in particular to those phenylene or phenyl radicals which can be substituted by substituents selected from alkyl of 1 to 4 carbon atoms, alkoxy of 1 to 4 carbon atoms and sulfo, and/or by an optionally monosubstituted or disubstituted amino group.

Aliphatic radicals include straight-chain, branched and cyclic aliphatics or any combination thereof. Aliphatic radicals are thus for example alkyl groups or alkylene groups of 1 to 6, preferably 1 to 4, carbon atoms each, which can be substituted. Substituted alkyl and alkylene groups, including the substituted alkyl groups of the formula radical T, are for example those which can be substituted by 1 or 2 substituents of the group chlorine, alkoxy of 1 to 4 carbon atoms, alkanoylamino of 2 to 5 carbon atoms, cyano, sulfato, phosphato, acetyloxy, sulfo, carboxy or substituted or unsubstituted aryl (preferred substituents thereamong being the carboxy and sulfo groups), or radicals of cycloalkyl groups having 5 to 8 carbon atoms, such as, for example, cyclopentane and cyclohexane radicals which can contain methyl and ethyl groups as substituents.

Heretofore and hereinafter, sulfo groups are groups which conform to the general formula $-SO_3M$, carboxy groups are groups which conform to the general formula $-COOM$, sulfato groups are groups which conform to the general formula $-OSO_3M$, thiosulfato groups are groups which conform to the general formula $-S-SO_3M$ and phosphato groups are groups which conform to the general formula $-OPO_3M_2$, where M has here, as well as later, the following meaning: M is a hydrogen atom or an alkali metal, such as sodium, potassium and lithium, or one equivalent of an alkaline earth metal, such as, for example, of calcium, but in particular an alkali metal.

The formula members W are for example cycloalkylene groups of 5 or 6 carbon atoms with 1 to 3 methyl groups as substituents or are alkylene groups of 2 to 6 carbon atoms, in particular of 2 to 4 carbon atoms, the alkylene chain of which can be interrupted by one or two cycloaliphatic radicals or by 1 or 2 hetero groups which are preferably selected from —O—, —NH—, —N(R°)— with R° of the above meaning and from a heterocyclic radical, of which preferably a saturated heterocyclic radical, such as, for example, the bivalent N,N-piperidino radical, or are an alkylene-phenylene, a phenylene-alkylene, a phenylene-alkylene-phenylene or alkylene-phenylene-alkylene radical, the alkylene radicals in these araliphatic radicals being those of 1 to 6, preferably 1 to 4, carbon atoms and optionally substituted by the stated substituents and/or interrupted by one or two of the hetero groups mentioned, and the benzene rings can each be additionally substituted by 1 or 2 substituents which are selected from the group of substituents consisting of sulfo, carboxy, sulfamoyl, carbamoyl, methyl, ethyl, methoxy, ethoxy, nitro, amino, amino which is substituted by substituted or unsubstituted aliphatic and/or substituted or unsubstituted aryl radicals and chlorine, in the case of an alkylene group being interrupted by hetero groups the alkylene portions therein preferably being those of 2 or 3 carbon atoms, it being possible for the aliphatic aryl radicals to be additionally linked by an oxygen atom or an —NH— group. The formula members W are furthermore preferably a phenylene radical, in particular a meta- or para-phenylene radical, which can be additionally substituted by 1 or 2 substituents from the group chlorine, sulfo, carboxy, sulfamoyl, carbamoyl, methyl, ethyl, methoxy, ethoxy, amino and amino which is substituted by substituted or unsubstituted aliphatic and/or substituted or unsubstituted aryl radicals and chlorine, but preferably by sulfo, or are an optionally sulfo-substituted naphthylene radical.

Preferably W is an alkylene radical of 2 to 4 carbon atoms or a phenylene radical which can be substituted by 1 or 2 substituents from the group sulfo, carboxy, methyl, methoxy, ethoxy and chlorine, or is an alkylenephenylene radical from these radicals; the radicals can also be linked with one another by an oxygen atom, a cyclohexylene, a monomethylcyclohexylene, or dimethylcyclohexylene group or an —NH—, —N(CH₃)— group or piperidine group.

A radical W is for example the meta- or para-phenylene radical, the 1,2-ethylene or 1,3-propylene radical or a 2-methyl-1,2-ethylene, 1-methyl-1,2-ethylene, 2-etyl-1,2-ethylene, 1-ethyl-1,2-ethylene, 1-methyl-1,3-propylene, 3-methyl-1,3-propylene, 1,2-dimethyl-1,2-ethylene, 1,4-butylene, 1-carboxy-1,5-pentylene, 5-carboxy-1,5-pentylene, 2-sulfato-1,3-propylene, 2-carboxy-1,3-propylene, 2-methyl-1,3-propylene, 2,2-dimethyl-1,3-propylene, 1,3-dimethyl-1,3-propylene, 2-methoxy-1,3-propylene, 1,4-dimethyl-1,4-butylene, 1,5-pentylene or a 1,6-hexylene radical or a radical of the general formula —CH₂—CH₂—Q—CH₂—CH₂—, in which Q stands for the formula radical —O—, —S—, —SO₂—, —NH— or —N(CH₃)—, or W is for example a 1,2-cyclohexylene, 1,3-cyclohexylene, 1,4-cyclohexylene, 4-methyl-1,3-cyclohexylene, 6-methyl-1,3-cyclohexylene, 2-methyl-1,3-cyclohexylene, 5,5-dimethyl-1,3-cyclohexylene, 2-methyl-1,4-cyclohexylene, 5-methyl-1,4-cyclohexylene or a 4,6-dimethyl-1,3-cyclohexylene radical or a radical of the formula

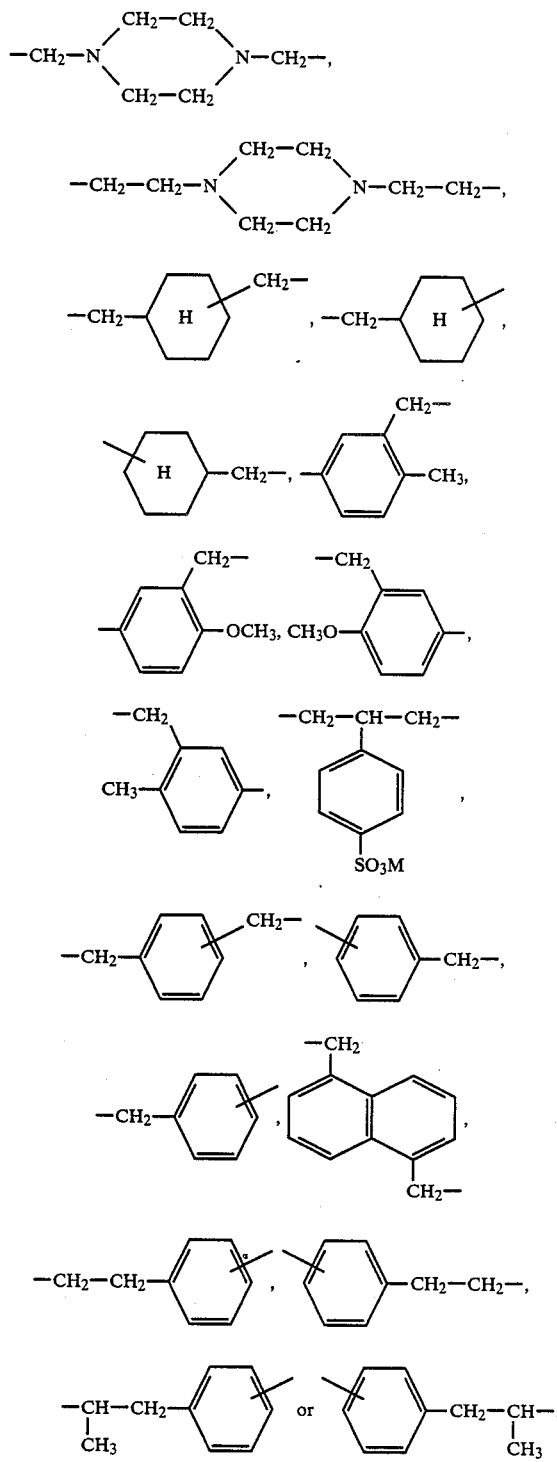

Further aromatic bridge members of W are for example the 1,2-phenylene, 3-methyl-1,2-phenylene, 4-methyl-,1,2-phenylene, 2-methyl-1,3-phenylene, 4-methyl-1,3-phenylene, 5-methyl-1,3-phenylene, 2-methyl-1,4-phenylene, 2,4,6-trimethyl-1,3-phenylene, 2,3,5,6-tetramethyl-1,4-phenylene, 2,5-dimethyl-1,3-phenylene, 2-methyl-6-ethyl-1,3-phenylene, 2-methyl-4,6-diethyl-1,3-phenylene, 2,6-diethyl-4-methyl-1,3-phenylene, 2- methoxy-1,3-phenylene, 4-methoxy-1,3-phenylene, 6-methoxy-1,3-phenylene, 2-methoxy-1,4-phenylene, 4-chloro-1,3-phenylene, 2-chloro-1,4-phenylene, 4-chloro-1,3-phenylene, 2-chloro-1,4-phenylene, 3-carboxy-1,4-phenylene or 4-carboxy-1,3-phenylene radical and furthermore in particular the phenylene and naphthylene radicals which are substituted by 1 or 2 sulfo groups, such as, for example, 4-sulfo-1,2-phenylene, 4-sulfo-1,3-phenylene, 3-sulfo-1,4-phenylene, 2-sulfo-1,4-phenylene, 4,6-disulfo-1,3-phenylene, 2,5-disulfo-1,4-phenylene, 2-methyl-5-sulfo-1,3-phenylene, 2-methyl-4-sulfo-1,3-phenylene, 2,4,6-trimethyl-5-sulfo-1,3-phenylene, 2,6-dimethyl-4- and -5-sulfo-1,3-phenylene, 2-methyl-6-sulfo-1,3-phenylene, 4-methyl-6-sulfo-1,3-phenylene, 6-methyl-4-sulfo-1,3-phenylene, 3-methyl-6-sulfo-1,4-phenylene, 6-methoxy-4-sulfo-1,3-phenylene, 4-methoxy-6-sulfo-1,3-phenylene or 4,8-disulfo-2,6-naphthylene.

Heterocyclic groupings which are formed jointly from the radicals R*, R⁰ and W with the two nitrogen atoms are for example those of the formulae

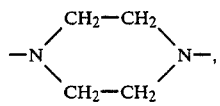

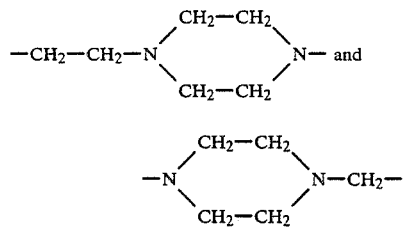

The substituents R*, R', R" and R⁰, in the meaning of substituted alkyl groups, are preferably those alkyl groups of 1 to 4 carbon atoms which are substituted by a phenyl radical, a phosphato group or an alkoxy group of 1 to 4 carbon atoms, but preferably by 1 or 2 substituents, in particular 1 substituent, selected from carboxy, sulfo and sulfato. Preferably, however, R*, R', R" and R⁰ each denote a hydrogen atom.

In the amino group of the general formula (3a) R¹ denotes in particular a hydrogen atom, an alkyl group of 1 to 4 carbon atoms, such as the methyl or ethyl group, or an alkyl group of 1 to 4 carbon atoms which is substituted by 1 or 2 substituents, preferably 1 substituent, selected from alkoxy of 1 to 4 carbon atoms, chlorine, cyano, carboxyl, sulfo, sulfato, phosphato, hydroxy, phenyl, naphthyl, substituted phenyl, substituted naphthyl and 1 group of the formula (4a), (4b), (5a) or (5b) mentioned and defined below. Substituted phenyl radicals are here in particular those which are substituted by 1, 2 or 3 substituents which are selected from the set consisting of 3 alkyl groups of 1 to 4 carbon atoms, of which in particular the methyl groups, 2 alkoxy groups of 1 to 4 carbon atoms, of which in particular the methoxy or ethoxy groups, 1 bromine atom, 2 chlorine atoms, 2 sulfo groups and 1 carboxy group. Substituted naphthyl radicals are here in particular those which are substituted by 1, 2 or 3 sulfo groups or 1, 2 or 3 substituents selected from the set consisting of 2 sulfo groups, 1 carboxy group, 1 chlorine atom, 1 alkyl group of 1 to 4 carbon atoms, of which in particular the methyl group, and 1 alkoxy group of 1 to 4 carbon atoms, of which in particular the methoxy or ethoxy group.

The formulae (4a), (4b), (5a) and (5b) are:

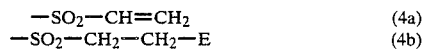
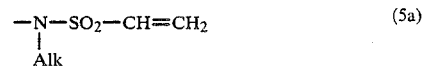
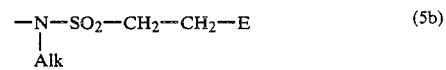

$$-N-SO_2-CH_2-CH_2-E \quad (5b)$$
$$\overset{|}{Alk}$$

in which

E stands for an alkalinically eliminatable substituent and
Alk denotes a hydrogen atom, but preferably an alkyl group of 1 to 4 carbon atoms, such as, in particular, the methyl or ethyl group.

The fiber-reactive groups of the formulae (4a) and (4b) are preferred.

The substituent $R^2$ denotes in particular a hydrogen atom, an alkyl group of 1 to 4 carbon atoms, the phenyl radical, the cyclohexyl radical or a naphthyl radical which is substituted by 1, 2 or 3 sulfo groups, but preferably denotes a substituted phenyl radical or a substituted alkyl radical of 1 to 4 carbon atoms or a naphthyl radical which is substituted by 1, 2 or 3 substituents from the set consisting of 2 sulfo groups and 1 group of the formula (4a), (4b), (5a) and (5b) mentioned and defined above. Substituted phenyl radicals are here in particular those which are substituted by 1, 2 or 3 substituents, preferably 1 or 2 substituents, which are selected from the set consisting of 3 alkyl groups of 1 to 4 carbon atoms, of which in particular the methyl groups, 2 alkoxy groups of 1 to 4 carbon atoms, of which in particular the methoxy and ethoxy groups, 1 bromine atom, 2 chlorine atoms, 2 sulfo groups, 1 carboxy group and 1 group of the formula (4a), (4b), (5a) or (5b) mentioned and defined above, and substituted alkyl groups are here in particular those alkyl groups of 1 to 4 carbon atoms which are substituted by 1 or 2 substituents, preferably 1 substituent, selected from alkoxy of 1 to 4 carbon atoms, sulfo, sulfato, phosphato, carboxy, chlorine, cyano, hydroxyl, cyclohexyl, a group of the formula (4a), (4b), (5a) or (5b), phenyl, naphthyl, substituted phenyl and substituted naphthyl, the substituted phenyl groups here being preferably phenyl groups having 1, 2 or 3, preferably 1 or 2, substituents from the set consisting of 3 alkyl groups of 1 to 4 carbon atoms, of which in particular the methyl groups, 2 alkoxy groups of 1 to 4 carbon atoms, of which in particular the methoxy and ethoxy groups, 1 bromine atom, 2 chlorine atoms, 2 sulfo groups, 1 carboxy group and 1 group of the formula (4a), (4b), (5a) or (5b) mentioned and defined above, and substituted naphthyl groups furthermore being here preferably a mono-, di- and trisulfonaphthyl group or a naphthyl radical which is substituted by 1, 2 or 3 substituents from the set consisting of 2 sulfo groups and 1 group of the formula (4a), (4b), (5a) or (5b).

If a radical of the formulae (4) and (5) is bonded to the benzene nucleus of the phenylamino radical, it is preferably in the meta- or para-position relative to the amino group thereof. If the radical of the formula (4a) and (4b) is bonded to an alkylamino radical, the alkyl radical is preferably an alkylene radical of 2 to 4 carbon atoms to which the radical of the formula (4) is bonded in the terminal position.

Alkalinically eliminatable substituents E which are eliminated by means of an alkali with formation of the vinyl group are for example alkanoyloxy groups of 2 to 5 carbon atoms, such as the acetyloxy group, or an acyl group of an arylcarboxylic acid, of an arylsulfonic acid or of an alkanesulfonic acid, such as, for example, the benzoyloxy, sulfobenzoyloxy, p-methylphenylsulfonyloxy or methylsulfonyloxy group, furthermore dialkylamino groups having alkyl radicals of 1 to 4 carbon atoms, such as the dimethylamino or diethylamino group, trialkylammonium groups having alkyl radicals of 1 to 4 carbon atoms, such as the trimethylammonium group, the chlorine atom, the bromine atom, a phosphato group, thiosulfato or sulfato group. Preference is given here to the chlorine atom, the phosphato, acetyloxy and thiosulfato group and in particular to the sulfato group.

The formula radical T is for example a methyl, ethyl, propyl, benzyl or phenyl group or a sulfo- or carboxy-substituted ethyl or propyl group or a sulfato-substituted n-propyl group or a benzyl or phenyl group both substituted by 1 or 2 sulfo groups. The formula radical T is preferably an alkyl radical of 1 to 6 carbon atoms, in particular of 1, 2 or 3 carbon atoms, which can be substituted by a sulfo or carboxy group; T is in particular the methyl, ethyl or β-sulfoethyl group. The formula radical B is preferably the amino group —NH—, and R is preferably a hydrogen atom. Preferably the formula radical W is a straight-chain or branched alkylene radical of 2 to 4 carbon atoms, preferably of 2 or 3 carbon atoms, or a meta- or para-phenylene group which can be substituted by 1 or 2 sulfo groups. Preferably Y is a phenylamino group which is substituted by 1 or 2 sulfo groups or by 1 vinylsulfonyl group or 1 β-sulfatoethylsulfonyl group, or is a benzyl or phenethyl group which is substituted in the benzene nucleus by 1 vinylsulfonyl group or 1 β-sulfatoethylsulfonyl group; of these preference is given to Y being a phenylamino group each substituted in the meta or para position relative to the amino group by 1 vinylsulfonyl group or in particular by 1 β-sulfatoethylsulfonyl group. The formula radical Y' is preferably a phenylamino group which is substituted by 1 or 2 sulfo groups. W* is preferably an alkylene radical of 2 or 3 carbon atoms or a meta- or para-phenylene group which can be substituted by 1 or 2 sulfo groups. The formula members $R^3$ and $R^4$ preferably denote a hydrogen atom.

Amino groups of the general formula (3a) are for example the primary amino group itself, the methylamino, ethylamino, n-propylamino, iso-propylamino, n-butylamino, n-hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfatoethylamino, β-hydroxyethylamino, N,N-di-(β-hydroxyethyl)-amino, γ-hydroxypropylamino, bis-[β-(β'-chloroethylsulfonyl)ethyl]-amino, benzylamino, phenethylamino, cyclohexylamino, N-methyl-N-phenylamino, N-ethyl-N-phenylamino, N-propyl-N-phenylamino, N-butyl-N-phenylamino, N-β-cyanoethyl-N-phenylamino, N-ethyl-N-(2-methylphenyl)-amino, N-ethyl-N-(4-methylphenyl)-amino, N-ethyl-N-(3-sulfophenyl)-amino, N-ethyl-N-(4-sulfophenyl)-amino and the phenylamino radical, furthermore the toluidino, xylidino, chloroanilino, anisidino and phenetidino radicals, similarly a sulfomethylanilino radical, the 2-sulfoanilino, 3-sulfoanilino, 4-sulfoanilino, 2,5-disulfoanilino, N-sulfomethylanilino, 3-carboxyanilino, 4-carboxyanilino, 2-carboxy-5-sulfoanilino, 2-carboxy-4-sulfoanilino, 4-sulfonaphth-1-ylamino, 3,6-disulfonaphth-1-ylamino, 3,6,8-trisulfonaphth-1-ylamino, 4,6,8-trisulfonaphth-1-ylamino, 6-sulfonaphth-2-ylamino, pyrid-2-ylamino, morpholino, piperidino and piperazino radical, furthermore the 2-, 3- or 4-(β-sulfatoethylsulfonyl)-phenylamino, the 3-(β-phosphatoethylsulfonyl)-phenylamino, 3-(β-chloroethylsulfonyl)-phenylamino, 3-(β-sulfatoethylsulfonyl)-4-methylphenylamino, 3-(β-sulfatoethylsulfonyl)-4-methoxyphenylamino, 2-sulfo-4-(β-sulfatoethylsulfonyl)-phenylamino, 2-sulfo-5-(β-sulfatoethylsulfonyl)-phenylamino, 2,4-disulfo-5-(β-sulfatoethylsulfonyl)-phenylamino, 4-(β-sulfatoethylsulfonyl)-naphth-1-ylamino, 6-sulfo-8-(β-sulfatoethylsulfonyl)-naphth-2-ylamino, 2,5-dimethoxy-4-vinylsulfonylphenylamino, 2-methoxy-5-methyl-4-(β-sulfatoethylsulfonyl)-phenylamino, 2,5-diethoxy-4-(β-sulfatoethylsulfonyl)-phenylamino, 2-bromo-4-(β-sulfatoethylsulfonyl)-phenylamino, 2-bromo-4-vinylsulfonylphenylamino, 3- or 4-vinylsulfonylphenylamino, 2-hydroxy-4-(β-sulfatoethylsulfonyl)-phenylamino, 2-sulfo-5-vinylsulfonylphenylamino, 3-(N-methyl-N-β-sulfatoethylsulfonyl)-amidophenylamino, 3-(N-ethyl-N-β-sulfatoethylsulfonyl)-aminophenylamino, 2,5-dimethoxy-4-(β-sulfatoethylsulfonyl)-phenylamino, 2-carboxy-4-(β-sulfatoethylsulfonyl)-phenylamino, 2-carboxy-5-(β-sulfatoethylsulfonyl)-phenylamino, 2-methyl-5-(β-sulfatoethylsulfonyl)-phenylamino, 2-chloro-5-(β-sulfatoethylsulfonyl)-phenylamino, 2-methoxy-5-(β-sulfatoethylsulfonyl)-phenylamino, 8-(β-sulfatoethylsulfonyl)-naphth-2-ylamino, 2,4-disulfo-5-vinylsulfonylphenylamino, 2,4-disulfo-5-(β-phosphatoethylsulfonyl)phenylamino, 2,4-disulfo-5-(β-chloroethylsulfonyl)-phenylamino, 6-sulfo-8-(β-phosphatoethylsulfonyl)-naphth-2-ylamino, 6-sulfo-8-vinylsulfonylnaphth-2-ylamino, 2-methoxy-5-methyl-4-(β-chloroethylsulfonyl)-phenylamino, 2-hydroxy-5-(β-sulfatoethylsulfonyl)-phenylamino, 2-(β-sulfatoethylsulfonamido)-phenylamino, β-(4-β'-sulfatoethylsulfonylphenyl)-ethylamino and 4-chloro-3-(β-sulfatoethylsulfonyl)-phenylamino radical.

A fiber-reactive radical A which does not conform to the general formula (2) is for example a radical of the formula —CO—CH=CH$_2$, —CO—CH=CH—Cl, —CO—C(Cl)=CH$_2$, —CO—C(Cl)=CH—COOH or —CO—CH=C(Cl)—COOH or is the β-chloropropionyl, γ-(phenylsulfonyl)-propionyl, γ-(methylsulfonyl)-propionyl, β-sulfatoethylaminosulfonyl, vinylsulfonyl, β-chloroethylsulfonyl, β-sulfatoethylsulfonyl, β-phosphatoethylsulfonyl, β-thiosulfatoethylsulfonyl, β-(methylsulfonyl)-ethylsulfonyl, β-(phenylsulfonyl)-ethylsulfonyl, 3-(β-chloroethylsulfonyl)-benzoyl, 2-fluoro-2-chloro-3,3-difluorocyclobutane-1-carbonyl, 2,2,3,3-tetrafluorocyclobutane-1-carbonyl, 2,2,3,3-tetrafluorocyclobutane-1-sulfonyl, β-(2,2,3,3-tetrafluorocyclobut-1-yl)acryloyl, α-bromoacryloyl, β-bromoacryloyl, α,β-dichloropropionyl or α,β-dibromopropionyl group or an acryloyl group which is substituted in the α- or β-position by a lower alkylsulfonyl or arylsulfonyl group (such as a phenylsulfonyl group).

Preferred groups Y of the general formula (3b) are for example groups of the following formulae (6a), (6b), (6c) and (6d)

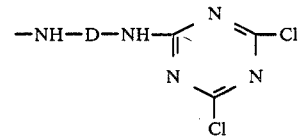
(6a)

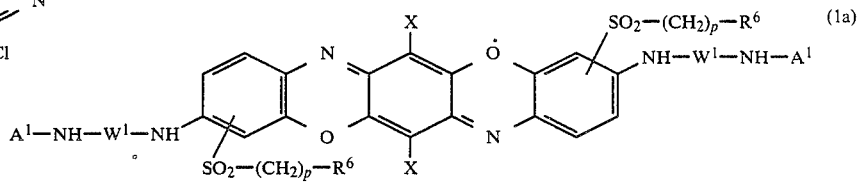
(1a)

Of the triphendioxazine compounds according to the invention, particular emphasis is given to those which conform to the general formula (1a)

in which
X in each case denotes a bromine atom or preferably a chlorine atom,
p stands for the number 2 or 3, preferably 2,
$R^6$ denotes a sulfato or carboxy group, but preferably a sulfo group, but in the case of p=2 $R^6$ is not a sulfato group, or the group —($CH_2$)—p—$R^6$ represents the methyl group,
$W^1$ stands for an alkylene radical of 2 to 6 carbon atoms which can be substituted by a sulfo or sulfato group or a sulfophenyl group, or denotes a cyclohexylene radical or a meta- or para-phenylene group or a meta- or para-phenylene group which is substituted by 1 or 2 sulfo groups, and
$A^1$ stands for a triazine radical of the general formula (2) in which Z denotes a fluorine or chlorine atom but preferably a chlorine atom, and Y is the 2,5-disulfophenyl group.

The doubly occurring formula members p, $R^6$, $W^1$ and $A^1$ preferably have in each case the same meaning.

Emphasis must further be given to the triphendioxazine compounds according to the invention which conform to a general formula (1b)

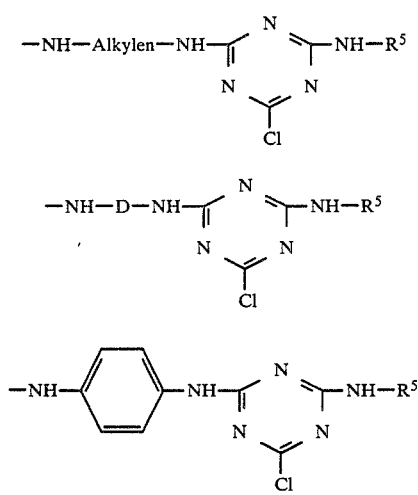
(6b)
(6c)
(6d)

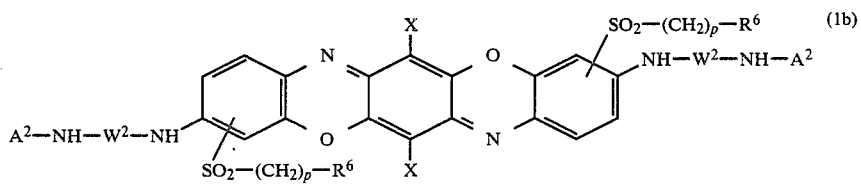
(1b)

in which
X, p and $R^6$ have the meanings mentioned for the formula (1a), or —($CH_2$)$_p$—$R^6$ is the methyl group, and
$W^2$ denotes the p-phenylene radical which is unsubstituted or substituted by 1 or 2 sulfo groups, preferably the monosulfo-p-phenylene radical, and
$A^2$ denotes a triazine radical of the general formula (2) in which Z stands for the fluorine atom, but preferably for the chlorine atom, and Y denotes a radical of the general formula (7)

in which D represents a radical of the formula (6e), (6f), (6g) or (6h)

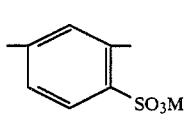
(6e)

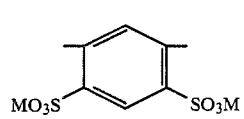
(6f)

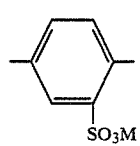
(6g)

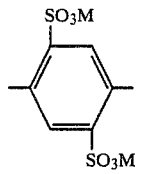
(6h)

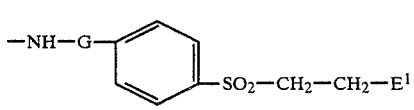
(7)

in which
G stands for the methylene or 1,2-ethylene group, but preferably is a direct bond, and
$E^1$ denotes a chlorine atom, a phosphato, acetyloxy or thiosulfato group, but preferably is a sulfato group.
The doubly occurring formula members $W^2$ and $A^2$ preferably have in each case the same meaning.

with M of the abovementioned meaning and $R^5$ stands for a monosulfophenyl or disulfophenyl group, such as in particular the 4-sulfophenyl, 3-sulfophenyl or 2,5-disulfophenyl group.

Of the compounds of the general formula (1), particular emphasis has to be given to those triphendioxazine compounds according to the invention which are described in the worked Examples 6 and 7 which follow later.

The new dioxazine compounds can be present not only in the acid form but also in the form of their salts. Preferably they are present in the form of their alkali metal salts, and are preferably also used in the form of these salts for dyeing (to be understood here and below in the general sense and as including printing) of hydroxy- and/or carboxamide-containing materials, in particular fiber materials.

The present invention further relates to processes for preparing the compounds of the general formula (1) which are mentioned and defined above, which comprise reacting a dioxazine compound of the general formula (8)

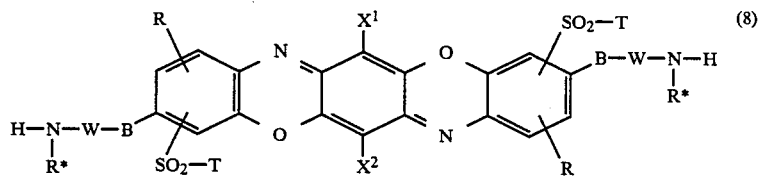

in which R*, R, B, W, T, X¹ and X² have the abovementioned meanings with twice the molar amount of a dihalogenotriazine compound of the general formula (9)

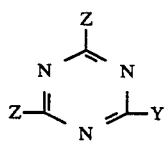

in which Z and Y have the abovementioned meanings, the two Z preferably being identical to each other, and if Y is likewise a halogen atom, Y preferably having the same meaning as Z, in a conventional manner of reacting amino compounds with halogenotriazine compounds, or reacting a dioxazine compound of the general formula (8) with twice the molar amount of a compound which is capable of introducing the acyl radical of a nonheterocyclic fiber-reactive group into the amino group —NR*H, such as, for example, the acid halide, such as the acid chloride or, such as, for example, the acid anhydride radical of fiber-reactive carboxylic and sulfonic acids, such as the acid halide or acid anhydride radicals of the fiber-reactive radicals mentioned above by way of example for A, or carbyl sulfate, or reacting a dioxazine compound of the general formula (8) with twice the molar amount of a compound of the general formula (10)

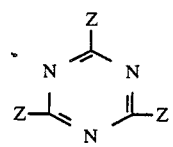

in which the Z, preferably identical to one another, have the abovementioned meanings, and reacting the bis-dihalogenotriazinylamino compound thus obtained of the general formula (11)

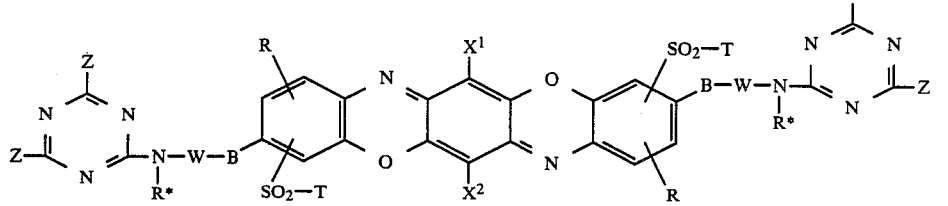

with twice the molar amount of an amino compound of the general formula H—Y where Y is equal to a radical of the formula (3a) or (3b). If in the formula (1) the formula radical W denotes the radical of an aliphatic amine, then the procedure mentioned first is preferred; if W represents the amino radical of an arylamine, then the lastmentioned procedure is preferred.

The reaction of dichlorotriazylamino compounds of the general formulae (9) or (11) or of a cyanuric halide of the general formula (10) with an amino compound of the general formula (8) or of the general formula H—Y can be effected analogously to European Patent Application Publication Nos. 0,101,665A and 0,103,156A, namely in an organic or aqueous organic medium, preferably in an aqueous medium, it being possible for the organic medium to be for example acetone, dimethyl sulfoxide or dimethylformamide. To maintain a certain pH value, the acid-binding agents used is, for example, an alkali metal and alkaline earth metal carbonate, alkali metal and alkaline earth metal hydrogencarbonate or hydroxide or alkali metal acetate, or mixtures of these acid-binding agents; of the alkali metal compounds and alkaline earth metal compounds, those of sodium, potassium and calcium are here preferred.

The reaction of a cyanuric halide with an amino compound H—Y or an amino compound of the general formula (8) is in general effected at a temperature between −10° C. and +25° C., preferably between 0° and 10° C., and at a pH value at between 1 and 6, preferably between 3 and 5.

The second condensation reaction, the reaction of a dihalogenotriazinyl compound of the general formula (9) with an amino compound of the general formula (8) or of a dihalogenotriazinyl compound of the general formula (11) with an amino compound of the formula H—Y is in general effected at a temperature between 0°

C. and 60° C., preferably between 10° and 50° C., and at a pH value between 3 and 9, preferably between 5 and 8.

The starting dioxazine compounds of the general formula (8) can be prepared analogously to known procedures from compounds of the general formula (12)

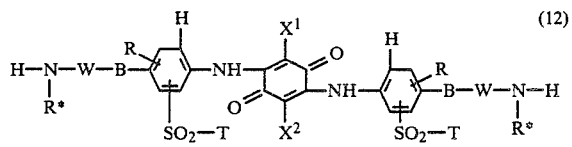

(in which R*, R, B, W, T, $X^1$ and $X^2$ have the abovementioned meanings, where substituted alkyl groups in these radicals can also be hydroxy-substituted alkyl groups and the groups —$SO_2$—T are preferably bonded in the ortho-position relative to the group —B—W—NHR* and the benzene nuclei must not be substituted in any of the ortho-positions relative to the indicated amino group —NH—) by ring closure, for example in an acid medium and if desired in the presence of an oxidizing agent, such as in particular in sulfuric acid or $SO_3$-containig sulfuric acid as a reaction medium, the oxidizing agent used being sulfur trioxide, ammonium persulfate, alkali metal persulfates, iodine or inorganic iodine compounds in the presence of oleum, sodium borate, preferably, however, sodium peroxodisulfate or potassium peroxodisulfate (conforming to the formulae $Na_2S_2O_8$ and $K_2S_2O_8$ respectively). Such procedures are known for example from the British Patent No. 1,589,915 and European Patent Application Publication No. 0,141,359A.

Preferably the reaction is carried out in concentrated sulfuric acid, such as 96 to preferably 100% strength sulfuric acid, and in particular in $SO_3$-containing sulfuric acid (oleum), such as up to 50% strength by weight oleum. The reaction temperature is chosen between 0° and 60° C. The oleum used as a reaction medium and agent generally contains 5 to 30% by weight, preferably 10 to 20% by weight, of sulfur trioxide. In the case of adding peroxodisulfate as an oxidizing agent, the cyclization is carried out between 0° and 40° C., preferably between 15° and 25° C. If oleum/peroxodisulfate is used, the reaction temperature should not exceed 30° C. Preference is given to 10 to 20% strength oleum together with an amount of peroxodisulfate which is equivalent to compound (12). In the case of iodine as the oxidizing agent, it is used in catalytic amounts in 10 to 50% strength oleum; in this case the reaction temperature is in general between 0° and 40° C.

Any hydroxyalkyl groups present can be esterified if desired before or simultaneously with the cyclization or even only after the cyclization reaction by means of a sulfatizing or phosphatizing agent, such as 96–100% strength sulfuric acid or $SO_3$-containing sulfuric acid or polyphosphoric acid to give the corresponding sulfatoalkyl and phosphatoalkyl groups respectively. If the ring closure is thus carried out in sulfuric acid or oleum as the reaction medium, hydroxy groups which are bonded to an alkyl radical of the molecule, such as a hydroxyalkyl group of formula radicals W and R*, are converted into the corresponding sulfatoalkyl groups.

Simultaneously with the cyclization—or even in a separate batch—it is possible, according to the invention, also to introduce sulfo groups into the aromatic rings of the triphendioxazine (including the corresponding aryl radicals of W, T, $X^1$ and $X^2$) by means of 100% strength sulfuric acid or oleum.

The compounds of the general formula (8) can be prepared analogously to known procedures by reacting a compound of the general formula (13)

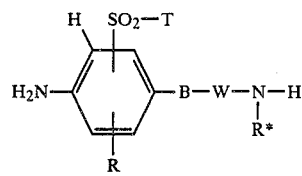

in which R*, R, B, W and T have the abovementioned meanings, where substituted alkyl groups in these radicals can also be hydroxy-substituted alkyl groups and the groups —$SO_2$—T are preferably bonded in the ortho-position relative to the group —B—W—NHR*, with a 1,4-benzoquinone compound of the general formula (14)

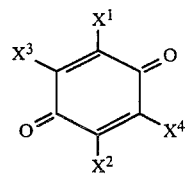

in which $X^1$ and $X^2$ have the abovementioned meanings and $X^3$ and $X^4$ are identical to or different from each other and each stands for a hydrogen atom, an alkoxy group of 1 to 4 carbon atoms, such as in particular the methoxy group, or for a phenoxy group or preferably is a halogen atom, such as a fluorine atom, in particular a bromine atom and especially a chlorine atom, where $X^3$ and $X^4$ can also be identical to $X^1$ and $X^2$.

The reaction of a compound of the general formula (13) or of two different amino compounds of the general formula (13), in each case together in twice the equivalent amount, with an equivalent of a compound of the general formula (14) to give the compound of the general formula (12) is effected analogously to known procedures, which are described for example in K. Venkataraman, "The Chemistry of Synthetic Dyes", Volume V, pages 419–427 (1971), and in Ullmann's Encyklopädie der technischen Chemie [Encyclopedia of Industrial Chemistry], 4th edition, Volume 8, pages 240+241 (1974), and also in British Patent Application Publication No. 2,019,872, in German Offenlegungsschrift No. 2,823,828 and in European Patent Application Publication No. 0,141,996A. For example, the reaction can be effected in an aqueous medium or in an aqueous organic medium or in a purely organic medium, the organic solvents being polar aprotic and protic solvents, such as, for example, lower alkanols, such as methanol and ethanol, and halogenated benzenes, such as o-dichlorobenzene. However, preferably the quinone of the formula (14) is used in a more or less pronounced excess which is generally 2–20%, but, depending on the quinone chosen, can even be up to 100% or more. The reaction of the amines (13) with the quinones (14) can be carried out at a temperature between 20° and 100° C., preferably between 50° and 70° C., in the presence of an acid-binding agent, such as, for example, an alkali metal or alkaline earth metal carbonate or acetate, for example sodium acetate, sodium carbonate or sodium bicarbonate, or an alkali metal or alkaline earth metal hydroxide such as sodium hydroxide, or an oxide of an alkaline earth metal, such as, for example, magnesium oxide. If the reaction is carried out in an aqueous or aqueous organic medium, a pH range between 4 and 7, preferably between 5.5 and 6.5, is set.

The aniline starting compounds of the general formula (13) where the formula radical B is —NH— or —N(R'')— have hitherto not been disclosed. However, they can be prepared analogously to known procedures of reacting chloronitrobenzenes with amines, for example by reacting a chloronitrobenzene of the general formula (15)

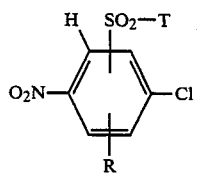 (15)

in which R and T have the abovementioned meanings, with an amine of the general formula (16)

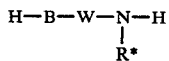 (16)

in which W and R* have the abovementioned meanings and B is the group —NH— or —N(R'')—, in water or an organic medium, such as an alkanol, for example methanol, dioxane and toluene, or in a mixture of water and water-miscible organic solvents, in the presence of a basic, acid-binding agent, such as, for example, potassium carbonate, magnesium oxide, sodium carbonate or sodium hydroxide, at a temperature between 20° and 100° C., preferably between 60° and 90° C.

In the aqueous medium a pH value between 6 and 11, preferably between 8 and 10, is maintained. Such procedures are known for example from processes for preparing p-nitrodiphenylamine-o-sulfonic acid from 2-chloro-5-nitrobenzenesulfonic acid (see for example Chem. Ber. 41, 3744 ff. and 42, 1077 ff.), which, in the reduced form, likewise serve as starting compounds for dioxazine dyes.

The nitroaniline compounds of the general formula (17)

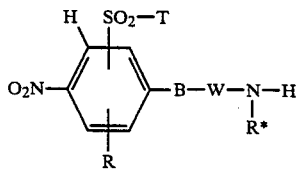 (17)

in which R, T, W and R* have the abovementioned meanings and B is the group —NH— or —N(R'')—, which are obtainable in this way and have likewise not yet been described and are consequently new can then be converted by conventional methods of reducing aromatic nitro compounds by means of hydrogen and a metallic catalyst, such as a palladium, platinum or Raney nickel catalyst, under pressure in an autoclave or by means of the Béchamp reduction using iron chips to the compound which conforms to the general formula (13).

The present invention thus also relates to the new aniline compounds of the general formula (13) and the new nitroaniline compounds of the general formula (17) and to processes for their preparation, and further to their use for synthesizing triphendioxazine compounds, in particular triphendioxazine compounds of the general formula (1).

Chloronitrobenzene compounds of the general formula (15) can be prepared for example analogously to the synthesis techniques for preparing sulfones described for example in Houben-Weyl, Methoden der Organischen Chemie [Methods of Organic Chemistry], Volume IX, pages 231 ff. (1955) and Volume E11, pages 1132 ff. (198), for instance via the sulfinic acid derivative, as in a conventional procedure of reducing a corresponding 1-chloro-4-nitrobenzenesulfochloride compound by means of sodium sulfite to the corresponding sulfinic acid and subsequently oxyalkylating the sulfinic acid to give the 8-hydroxyalkylsulfonyl compound, which is subsequently sulfatized. The sulfato group can then be converted in a conventional manner by means of sodium sulfite into the sulfo group. For instance, 2-(β-sulfoethylsulfonyl)-4-nitrochlorobenzene can be prepared by reacting 2-(β-sulfatoethylsulfonyl)-4-nitrochlorobenzene, which is obtainable from 1-chloro-4-nitrobenzenesulfochloride by the abovementioned method, with an aqueous sodium silfite solution at a temperature between 30° and 50° C. and a pH value between 6 and 9.5. The sulfinic acid compounds can also be used to prepare the carboxy-substituted alkyl sulfone compounds, for example by reaction with chloroacetic acid, acrylic acid or crotonic acid.

Some of the compounds of the general formula (15) can also be obtained by nitrating a corresponding alkylsulfonyl or arylsulfonylchlorobenzene compound in a conventional manner, for example analogously to the directions of Example 5 of German Patent No. 859,462.

The starting benzoquinones of the general formula (14) are widely described in the literature. Compounds of this type are for example 1,4-benzoquinone, 2-methyl-1,4-benzoquinone, 2-ethyl-1,4-benzoquinone, 2-n-propyl-1,4-benzoquinone, 2-isopropyl-1,4-benzoquinone, 2-(β-ethoxyethyl)-1,4-benzoquinone, 2-phenyl-1,4-benzoquinone, 2-(4'-methylphenyl)-1,4-benzoquinone, 2-(4'-methoxyphenyl)-1,4-benzoquinone, 2-(3'-chlorophenyl)-2,5-dimethyl-1,4-benzoquinone, 2-methyl-5-ethyl-1,4-benzoquinone, 2-methyl-3-chloro-1,4-benzoquinone, 2-methyl-6-chloro-1,4-benzoquinone, 2-methyl-3,5-dichloro-1,4-benzoquinone, 2-methyl-3,5,6-tribromo-1,4-benzoquinone, 2-(4'-methylphenoxy)-3,6-dibromo-1,4-benzoquinone, 2-(3'-methylphenoxy)-3,6-dibromo- 1,4-benzoquinone, 2-methyl-3,5,6-trichloro-1,4-benzoquinone, 2-methyl-3-chloro-5-bromo-1,4-benzoquinone, 2-methyl-3,6-dichloro-1,4-benzoquinone, 2-methyl-3,6-dichloro-5-bromo-1,4-benzoquinone, 2-phenyl-3,6-dichloro-1,4-benzoquinone, 2-(4'-methoxyphenyl)-3,6-dichloro-1,4-benzoquinone, 2-(4'-chlorophenyl)-3,6-dichloro-1,4-benzoquinone, 2-(4'-nitrophenyl)-3,6-dichloro-1,4-benzoquinone, 2-(4'-nitrophenyl)-3,5,6-trichloro-1,4-benzoquinone, 2,5-dimethyl-3,6-dibromo-1,4-benzoquinone, 2,5-dimethyl-3-chloro-1,4-benzoquinone, 2-methyl-5-n-propyl-6-bromo-1,4-benzoquinone, 2-methyl-5-isopropyl-3-chloro-1,4-benzoquinone, 2-methyl-5-isopropyl-6-bromo-1,4-benzoquinone, 2-(2'-chlorophenyl)-3,5,7-tribromo-1,4-benzoquinone, 2-methyl-3-methoxy-1,4-benzoquinone, 2,3,5,6-tetramethoxy-1,4-benzoquinone, 2,3,5,6-tetraphenoxy-1,4-benzoquinone, 2,3,5,6-tetra- (4'-methylphenoxy)-1,4-benzoquinone, 2,3,5,6-tetra-(4'-methoxyphenoxy)-1,4-benzoquinone, 2,3,5,6-tetra-(4'-chlorophenoxy)-1,4-benzoquinone, 2,3,5,6-tetra-4-(3'-methyl-4'-chlorophenoxy)-1,4-benzoquinone, 2-ethyl-3,6-dimethoxy-1,4-benzoquinone, 2-chloro-3,6-dimethoxy-1,4-benzoquinone, 2,3,5-trimethoxy-1,4-benzoquinone, 2,5-di-methyl-3,6-dimethoxy-1,4-benzoquinone, 2,5-dimethyl-3,6-dimethoxy-1,4-benzoquinone, 2-methyl-3,6-dimethoxy-1,4-benzoquinone, 2-methyl-5,6-dimethoxy-1,4-benzoquinone, 2-ethyl-3,6-dimethoxy-1,4-benzoquinone, 2-chloro-3-n-propyl-5-methoxy-1,4-benzoquinone and 2-chloro-3,5-dimethoxy-1,4-benzoquinone, 2,3,5,6-tetrafluoro-1,4-benzoquinone and preferably 2,3,5,6-tetrabromo-1,4-benzoquinone and in particular 2,3,5,6-tetrachloro-1,4-benzoquinone.

Novel starting aniline compounds according to the invention and conforming to the general formula (13) are for example: 4-(4'-amino-3'-sulfophenylamino)-3-$\beta$-sulfoethylsulfonylaniline, 4-(3'-amino-4'-sulfophenylamino)-3-$\beta$-sulfoethylsulfonylaniline, 4-(4'-amino-2',5'-disulfophenylamino)-3-$\beta$-sulfoethylsulfonylaniline, 4-N-($\beta$-aminoethyl)-amino-3-$\beta$-sulfoethylsulfonylaniline, 4-N-($\beta$-aminopropyl)-amino-3-$\beta$-sulfoethylsulfonylaniline, 4-N-($\gamma$-aminopropyl)-amino-3-sulfoethylsulfonylaniline, 4-(4'-amino-3'-sulfophenylamino)-3-methylsulfonyl, 4-(3'-amino-4'-sulfophenylamino)-3-methylsulfonyl, 4-(4'-amino-3'-sulfophenylamino)-3-$\beta$-carboxyethylsulfonylaniline, 4-(4'-amino-3'-sulfophenylamino)-3-carboxymethylsulfonylaniline, 4-(4'-amino-3'-phenylamino)-3-($\gamma$-sulfopropylsulfonyl)-aniline, 4-N-($\gamma$-amino-$\beta$-hydroxypropyl)-amino-3-$\beta$-sulfoethylsulfonylaniline, 4-N-($\delta$-aminobutyl)-amino-3-$\beta$-sulfoethylsulfonylaniline, 4-N-(4'-amino-3'-sulfobenzyl)-amino-3-$\beta$-sulfoethylsulfonylaniline, 4-(4'-amino-3'-sulfophenoxy)-3-$\beta$-sulfoethylsulfonylaniline, 4-($\beta$-aminoethoxy)-3-$\beta$-sulfoethylsulfonylaniline, 4-(N-piperidino)-3-sulfoethylsulfonylaniline, 4-N-[$\beta$-($\beta'$-aminoethoxy)-ethyl]-amino-3-sulfo-ethylsulfonylaniline, 4-N-($\gamma$-amino-$\beta$-hydroxypropyl)amino-3-$\beta$-carboxyethylsulfonylaniline, 4-(4'-aminophenyl)amino-3-$\beta$-sulfoethylsulfonylaniline, 4-(4'-aminocyclohexyl)-amino-3-$\beta$-sulfoethylsulfonylaniline, 4-N-($\gamma$-hexylaminopropyl)-amino-3-$\beta$-sulfoethylsulfonylaniline and 4-(3'-aminophenyl)-amino-3-$\beta$-sulfoethylsulfonylaniline. Of these, the first six aniline compounds named may be singled out as preferred.

The compounds of the general formula (1) prepared according to the invention can be separated and isolated from the synthesis solutions by commonly known methods, for example either by precipitating from the reaction medium by means of electrolytes, such as, for example, sodium chloride or potassium chloride, or by evaporating the reaction solution, for example by spray-drying, if desired after a buffer substance has been added to this reaction solution.

The compounds of the general formula (1) according to the invention—hereinafter referred to as compounds (1)—have fiber-reactive properties and possess valuable dye properties. They can therefore be used for the dyeing (including printing) of natural, regenerated or synthetic hydroxyl-containing and/or carbamoyl-containing materials, for example in the form of sheet structures, such as paper and leather, or in the mass, of polyamide or polyurethane, but in particular of such materials in fiber form, such as cellulose fiber materials, silk, wool and synthetic polyamide and polyurethane fibers. It is also possible to use the solutions obtained in the synthesis of compounds (1), if desired after prior addition of a buffer substance and again if desired after concentrating, directly as liquid formulations in dyeing.

Compounds (1), in accordance with the use according to the invention, can be applied to and fixed on the substrates mentioned, in particular the fiber materials mentioned, by the application techniques known for water-soluble, in particular fiber-reactive, dyes, for example by bringing compound (1) in dissolved form onto or into the substrate and fixing it thereon or therein, through the agency of heat and/or through the agency of an alkaline agent. Such dyeing and fixing methods are widely described in the literature.

The present invention therefore also relates to the use of compounds (1) for dyeing (including printing) hydroxy- and/or carboxamide-containing materials, or rather to a process for their application to these substrates. Preferably, the materials are used in the form of fiber materials, in particular in the form of textile fibers, such as yarns, wound packages and fabrics. In this it is possible to proceed analogously to known methods of applying and fixing fiber-reactive dyes.

The dyeings and prints prepared with compounds (1) are distinguished by pure, predominantly blue, hues. In particular the dyeings and prints on cellulose fiber materials have very high tinctorial strengths and similarly very good light fastness properties, including good wet light and perspiration light fastness properties and also good hypochlorite bleach and chlorinated water fastness properties, furthermore excellent wet fastness properties, such as, for example, good to very good wash fastness properties at 60° to 95° C., even in the presence of perborates, acid and alkaline fulling, cross-dyeing and perspiration fastness properties, alkali, acid, water and seawater fastness properties, and also good pleating fastness, hot press fastness and crock fastness. They also have a good wet storage fastness and a very good resistance to acid fading on storing dyed material still moist with acetic acid. Furthermore, the dyeings are stable to the customary synthetic resin finishes. Some of the compounds (1) are comparable to fiber-reactive anthraquinone dyes in purity of hue and in important fastness properties.

The following Examples serve to illustrate the invention. The parts and the percentages are by weight, unless otherwise stated. Parts by weight relate to parts by volume as the kilogram relates to the liter.

The compounds described in the Examples by means of formulae are indicated in the form of the free acids; in general they are prepared and isolated in the form of their sodium or potassium salts and used in the form of their salts for dyeing. It is similarly possible to use the starting compounds and components which are mentioned in the form of the free acid in the Examples below, in particular the tabulated Examples, as such or in the form of their salts, preferably alkali metal salts, such as sodium and potassium salts, in the synthesis. The absorption maxima ($\lambda_{max}$ values) were determined in aqueous solution.

The $^1$H-NMR measurements were carried out in $D_2O$ with partially deuterated sodium 3-(trimethylsilyl)propionate, if not stated otherwise.

EXAMPLE 1

(a) An aqueous solution having a pH value of 7.0 is prepared in 250 parts of water of the sodium salts of 100 parts of 3-($\beta$-sulfoethylsulfonyl)-4-chloronitrobenzene and 57 parts of 1,4-diaminobenzene-2-sulfonic acid; 8.5 parts of magnesium oxide are added. The reaction mixture is refluxed for 7 hours; it is then allowed to cool down and subsequently stirred at room temperature for 2 hours. The precipitated sodium salt of 3-(β-sulfoethylsulfonyl)-4-(4'-amino-3'-sulfophenylamino)-nitrobenzene is filtered off with suction and dried. It has the following $^1$H-NMR data: δ=3.31 ppm (m,2H), 3.72 ppm (m,2H), 6.80 ppm (d,1H), 6.95 ppm (d,1H), 7.25 ppm (dd,1H), 7.59 ppm (d,1H), 8.15 ppm (dd,1H), 8.57 ppm (d,1H); the protons of the amino and sulfo groups were not visible.

(b) 130 parts of this nitro compound are dissolved in 500 parts of water; the hydrogenation is effected in the presence of a nickel catalyst in an autoclave at 60° to 80° C. under a hydrogen pressure of 50 bar. The catalyst is subsequently filtered off, and the filtrate is acidified and has added to it, to complete the precipitation of the aniline compound, potassium chloride in an amount of 20% based on the filtrate volume. The filtrate is then allowed to cool down, and the precipitate is filtered off with suction. The 3-(β-sulfoethylsulfonyl)-4-(4'-amino-3'-sulfophenylamino)-aniline thus prepared and isolated has the following $^1$H-NMR data: δ=3.20 ppm (m,2H), 3.85 ppm (m,2H), 6.94 ppm (d,1H), 7.03 ppm (d,1H), 7.14 ppm (dd,1H), 7.26 ppm (dd,1H), 7.48 ppm (d,1H), 7.53 ppm (d,1H); the protons of the amino and sulfo groups were not visible.

EXAMPLE 2

(a) A suspension of 165 parts of 3-(β-sulfoethylsulfonyl)-4-chloronitrobenzene in 250 parts of water has slowly added to it at about 30° C. in the course of one hour 111 parts of 1,2-diaminopropane. The batch is subsequently stirred at 50° C. for a further 2 hours, and after cooling down to about 20° C. is brought to pH 7 with concentrated aqueous hydrochloric acid. The precipitated 3-(β-sulfoethylsulfonyl)-4-(β-aminopropyl)-aminonitrobenzene is filtered off with suction, washed with a little methanol and dried. It has the following $^1$H-NMR data: δ=1.43 ppm (d,3H), 3.25 ppm (m,3H), 3.70 ppm (m,4H), 7.08 ppm (d,1H), 8.39 ppm (dd,1H), 8.60 ppm (d,1H); the protons of the amino and sulfo groups were not visible.

(b) 147 parts of the nitro compound obtained in a) are suspended in 1200 parts of water and hydrogenated at 60° to 80° C. under a hydrogen pressure of 50 bar in the presence of a nickel catalyst in an autoclave. The catalyst is subsequently filtered off, the filtrate is concentrated to about a quarter of the original volume, and the precipitated 3-(β-sulfoethylsulfonyl)4-(β-aminopropyl)-aminoaniline is filtered off with suction, subsequently washed with a little methanol and dried at 50° C. under reduced pressure. It has the following $^1$H-NMR data: δ=1.40 ppm (d,3H), 3.20 ppm (m,2H), 3.44 ppm (m,2H), 3.75 ppm (m,3H), 6.90 ppm (d,1H), 7.20 ppm (dd,1H), 7.25 ppm (d,1H); the protons of the amino and sulfo groups were not visible.

EXAMPLE 3

To prepare 3-(β-sulfoethylsulfonyl)-4-(γ-aminopropyl)aminoaniline, Example 2 is repeated, except that the 1,2-diaminopropane is replaced by 1,3-diaminopropane.

The 3-(β-sulfoethylsulfonyl)-4-(γ-aminopropyl)-aminonitrobenzene obtained has the following $^1$H-NMR data: δ=2.08 ppm (qn,2H), 3.25 ppm (m,4H), 3.60 ppm (m,4H), 6.97 ppm (d,1H), 8.23 ppm (dd,1H), 8.57 ppm (d, 1H); the protons of the amino and sulfo groups were not visible.

The 3-(β-sulfoethylsulfonyl)-4-(γ-aminopropyl)-aminoaniline obtained has the following $^1$H-NMR data: δ=2.00 ppm (qn,2H), 3.05 ppm (m,4H), 3.38 ppm (t,2H), 3.68 ppm (m,2H), 7.0 ppm (d,1H), 7.50 ppm (dd,1H), 7.62 ppm (d,1H); the protons of the amino and sulfo groups were not visible.

EXAMPLE 4

132 parts of 3-(β-sulfoethylsulfonyl)-4-chloronitrobenzene are added at a temperature between 70° and 80° C. to a mixture of 130 parts of water and 72 parts of ethylenediamine in the course of 30 minutes. The batch is then stirred further at that temperature for an hour and thereafter at 100° C. for a further hour, and after cooling down is brought to pH 7 with concentrated hydrochloric acid, and is then cooled down to 0° C. The precipitated yellow product is filtered off with suction, washed with a little methanol and if appropriate dried, and is then reduced in 600 parts of water in the presence of a palladium catalyst at 100° C. under a hydrogen pressure of 50 bar. The catalyst is filtered off, and the filtrate is reduced to about a quarter of the original volume, and the precipitated 3-(β-sulfoethylsulfonyl)-4-(β-aminoethyl)-aminoaniline is filtered off with suction, washed with a little methanol and dried at 50° C. under reduced pressure.

The 3-(β-sulfoethylsulfonyl)-4-(β-aminoethyl)-aminonitrobenzene obtained has the following $^1$H-NMR data (in D$_6$-dimethyl sulfoxide, using tetramethylsilane as internal standard): δ=2.72 ppm (t,2H), 3.03 ppm (t,2H), 3.28 ppm (NH), 3.70 ppm (m,4H), 7.12 ppm (d,1H), 7.50 ppm (NH), 8.30 ppm (dd,1H), 8.42 ppm (d,1H); further protons of the amino and sulfo groups were not visible.

EXAMPLE 5

To prepare 3-(β-sulfoethylsulfonyl)-4-piperazinylaniline, Example 2 is repeated, except that the 1,2-diaminopropane is replaced by an equivalent amount of 1,4-piperazine.

The 3-(β-sulfoethylsulfonyl)-4-piperazinylnitrobenzene has the following $^1$H-NMR data: δ=3.20 ppm (m,2H), 3.47 ppm (s,8H), 4.18 ppm (m,2H), 7.75 ppm (d,1H), 8.62 ppm (dd,1H), 8.79 ppm (d,1H); the protons of the amino and sulfo groups were not visible.

The 3-(β-sulfoethylsulfonyl)-4-piperazinylaniline has the following $^1$H-NMR data (in D$_6$-dimethyl sulfoxide, using tetramethylsilane as an internal standard): δ=2.58 ppm (m,2H), 3.05 ppm (d,4H), 3.25 ppm (d,4H), 3.85 ppm (m,2H), 5.42 ppm (s,NH), 6.88 ppm (dd,1H), 7.15 ppm (d,1H), 7.22 ppm (d,1H); further protons of the amino and sulfo groups were not visible.

EXAMPLE 6

(a) 90 parts of 3-(β-sulfoethylsulfonyl)-4-(4'-amino-3'-sulfophenylamino)-aniline and 25 parts of chloranil are suspended at pH 6 in 300 parts of water. While a pH value of 6 is maintained (by means of a total of 16 parts of sodium hydrogencarbonate), the batch is heated to 60° C. and is held at that temperature for 6 hours; the batch is then allowed to cool down to 20° C., when 20 parts of potassium chloride are added, followed by 50 parts of concentrated hydrochloric acid, and the precipitated quinoidal intermediate is filtered off with suction and dried.

(b) 32 parts of the product obtained in (a) are added at 20° C. to 330 parts of 15% strength oleum in the course of 20 minutes; the reaction mixture is stirred at that temperature for about 15 hours and is then poured onto 1500 parts of ice, and the precipitated triphendioxazine compound is filtered off with suction, suspended in 200 parts of water, dissolved with sodium hydrogencarbonate to give a neutral solution and is again salted out with sodium chloride, filtered off with suction and dried.

(c) The triphendioxazine compound is also obtainable when the cyclization is carried out in accordance with the above method (b) but using 350 parts of 20% strength oleum; the reaction batch can be worked up as in (b) after a reaction duration of only 3 hours.

(d) The cyclization reaction can also be effected by adding 32 parts of the quinoidal intermediate at 20° C. to 300 parts of 10% strength oleum, subsequently stirring the reaction mixture at that temperature for 2 hours, adding to the resulting solution 7.2 parts of sodium peroxodisulfate at 20° C. in the course of 20 minutes, subsequently stirring at 20° C. for 3 hours and then working up as in (b).

(e) 11 parts of the triphendioxazine compound obtained as in (b), (c) or (d) ($\lambda_{max} = 623$ nm) are dissolved in 200 parts of water. A small amount of a conventional dispersant is added, followed at 0° C. with stirring by 4.0 parts of cyanuric chloride, and the batch is subsequently stirred at 0° to 5° C. for 5 hours while maintaining a pH value of 4 to 5 by means of sodium hydrogencarbonate. The resulting clear solution of the primary condensation product then has added to it a neutral solution of 6.1 parts of 4-($\beta$-sulfatoethylsulfonyl)-aniline in 50 parts of water, is heated to 40°-50° C. and is maintained for 4 hours within that temperature range and within a pH range of 5 to 6 maintained with a little sodium bicarbonate. The triphendioxazine compound according to the invention is salted out with sodium chloride, filtered off with suction, mixed with a phosphate buffer and dried at 50° C. under reduced pressure (the compound according to the invention can also be obtained by evaporating or spray-drying the synthesis solution, if desired after addition of a phosphate buffer).

The compound according to the invention, written in the form of the free acid, has the presumable structure of the formula

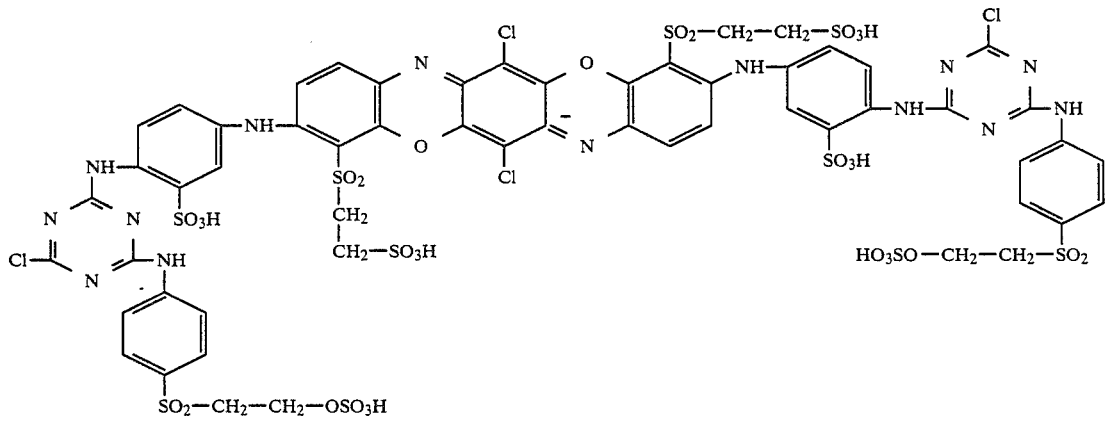

($\lambda_{max}$ = 615 nm)

(the respective $\beta$-sulfoethylsulfonyl group can also be bonded in the other ortho-position relative to the amino group, but is more likely to be present in the position indicated in the above formula).

This compound according to the invention has very good fiber-reactive dye properties. It dyes the materials mentioned in the description, in particular cellulose fiber materials, such as cotton, by the application and fixing methods known and customary in the art for fiber-reactive dyes in strong, sky-blue shades having good fastness properties, such as, in particular, good light fastness of the dry or moist (such as tap water moistened) dyeing, good alkaline perspiration light fastness, chlorinated water fastness, hypochlorite fastness, alkaline perspiration fastness, wash fastness even in the presence of perborates, wet storage fastness and acid fading resistance.

EXAMPLE 7

(a) 34 parts of 3-($\beta$-sulfoethylsulfonyl)-4-($\beta$-aminopropyl)aminoaniline and 13 parts of chloranil in 250 parts of water are stirred at 60° C. for 7 hours at pH 6 mintained with sodium hydrogencarbonate. The batch is then cooled down, and the product formed is filtered off with suction, washed with a little water and dried.

(b) 18 parts of the condensation product obtained in (a) are added at 20° C. to 270 parts of 20% strength oleum; the batch is then stirred at 20° to 25° C. for 3 hours until solution is complete. 9.5 parts of sodium peroxodisulfate are then added at 20° to 25° C. in the course of 20 minutes, the batch is then stirred at that temperature for a further 3 hours and is then discharged onto 1000 parts of ice, and the precipitated triphendioxazine compound is filtered off with suction. The still moist filter product is suspended in 200 parts of water, the suspension is neutralized with solid sodium hydrogencarbonate, and the product is salted out with about 15% of sodium chloride, based on the volume of this solution. The precipitated aminocontaining triphendioxazine compound is filtered off with suction and dried at 50° C. under reduced pressure.

(c) 6.0 parts of cyanuric chloride and about 0.5 part of a commercially available dispersant are suspended in 50 parts of water; at 0° C. a solution of 8.3 parts of aniline-2,5-disulfonic acid in 50 parts of water, which has a pH value of 5.5, is then added, and the batch is subsequently stirred for an hour at 0° to 5° C. while a pH value between 4 and 5 is maintained. To the resulting clear solution is then gradually added in the course of 30 minutes at about 20° C. and while a pH value of between 8 and 9 is maintained a pH 10 solution of 12.7 parts of the triphendioxazine compound prepared in (b) in 400 parts of water. The batch is then stirred at 30° C. for 4 hours while a pH value of between 8 and 9 is maintained with sodium carbonate, the pH is then adjusted to 6 with concentrated aqueous hydrochloric acid, and the resulting triphenoxazine compound according to the invention is precipitated with sodium chloride or is isolated by spray-drying the synthesis solution.

The triphendioxazine compound according to the invention, written in the form of the free acid, has the formula

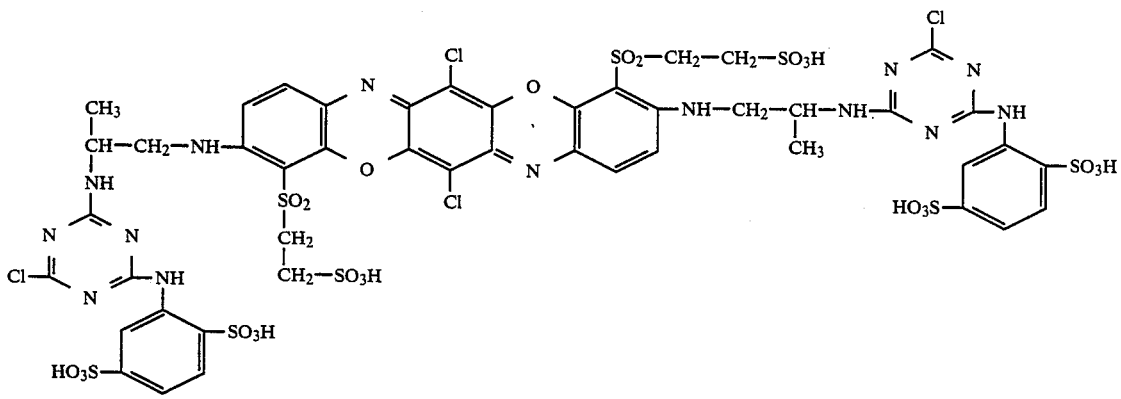

(λ$_{max}$ = 612 nm)

(the respective β-sulfoethylsulfonyl group can also be bonded in the other ortho-position relative to the amino group, but is more likely to be present in the position indicated in the above formula).

This compound according to the invention has very good fiber-reactive dye properties. It dyes the materials mentioned in the description, in particular cellulose fiber materials, such as cotton, by the application and fixing methods customary and known in the art for fiber-reactive dyes in strong, pure greenish blue shades having good fastness properties, such as in particular good light fastness of the dry or moist (such as tap water moistened) dyeing, good alkaline perspiration light fastness, chlorinated water fastness, hypochlorite fastness, alkaline perspiration fastness, wash fastness, even in the presence of perborates, wet storage fastness and acid fading resistance.

EXAMPLE 8

To prepare a triphendioxazine compound according to the invention, Example 7 is repeated, except that the 3-(β-sulfoethylsulfonyl)-4-(β-aminopropyl)-aminoaniline is replaced by an equivalent amount of 3-(β-sulfoethylsulfonyl)-4-(γ-aminopropyl)-aminoaniline. The compound according to the invention, written in the form of the free acid, has the presumable formula

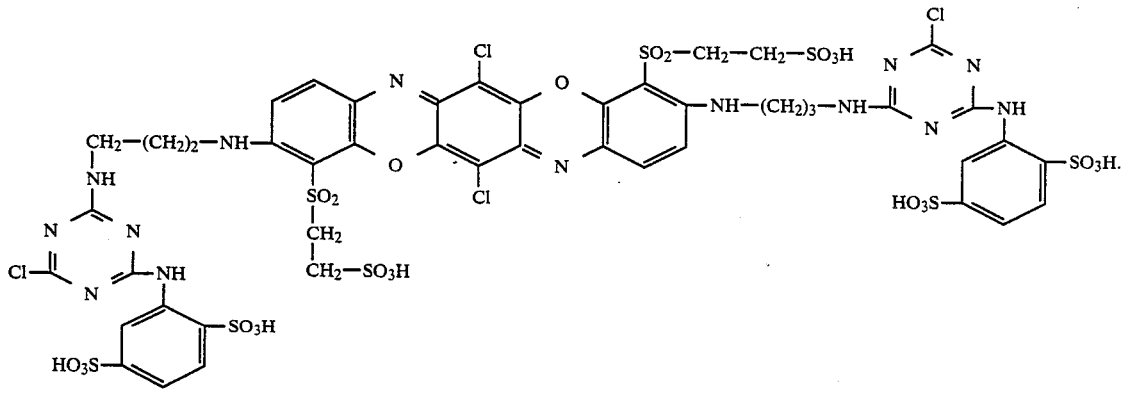

This compound according to the invention has very good fiber-reactive dye properties and produces on the fiber materials mentioned in the description, in particular on cellulose fiber materials, such as cotton fabric, by the application and fixing methods customary in the art for fiber-reactive dyes strong greenish blue dyeings and prints having good fastness properties, of which in particular the good light, perspiration and wet storage fastness properties can be singled out.

EXAMPLE 9

(a) 22 parts of chloranil are added to a suspension of 56 parts of 3-(β-sulfoethylsulfonyl)-4-(β-aminoethyl)aminoaniline in 200 parts of water. The batch is stirred at 65° C. for 5 hours while the pH value is maintained between 5 and 6. The product formed is filtered off under suction at 30° to 40° C., washed with a little water and dried under reduced pressure.

(b) 75 parts of the condensation product obtained in (a) are added at 15° to 20° C. to 460 parts of 20% strength oleum in the course of 30 minutes; stirring is continued overnight at 20° C. To the solution obtained are added 44 parts of sodium peroxodisulfate in the course of 20 minutes, during which the reaction temperature rises to 25°–27° C. The batch is subsequently stirred at 20° to 25° C. for a further 4 hours and is then stirred into 1300 parts of ice. The precipitated triphendioxazine compound is filtered off with suction, the moist filter cake is suspended in 1000 parts of water, and the suspension is brought to pH 6 with about 100 parts of sodium carbonate. The dioxazine compound is salted out from the suspension with sodium chloride, filtered off with suction and dried at 60° C. under reduced pressure.

(c) 5.5 parts of cyanuric chloride suspended with about 0.5 part of a commercially available dispersant at 0° to 5° C. in 50 parts of water. A pH 6 solution of 6.7 parts of aniline-2,5-disulfonic acid in 50 parts of water is added, and the batch is subsequently stirred at 0° to 5° C. for 4 hours while a pH value of 3 to 4 is maintained. To the clear solution formed are then added 11.4 parts of the dioxazine compound obtained in b) in finely ground form. The reaction mixture is maintained at a temperature of 30° to 40° C. and at a pH value between 7 and 8 for 5 hours; the batch is then clarified, and the compound according to the invention is salted out with sodium chloride, filtered off with suction and dried at 50° C. under reduced pressure.

The compound according to the invention, written in the form of the free acid, has the following structure:

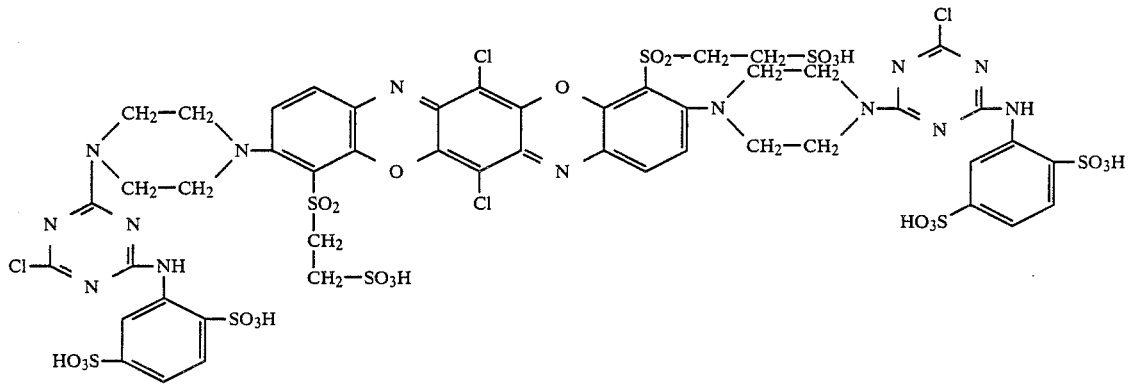

and prints having good fastness properties, of which in particular the good light, perspiration and wet storage fastness properties can be singled out.

EXAMPLE 10

To prepare a triphendioxazine compound according to the invention, Example 7 is repeated, except that the 3-(β-sulfoethylsulfonyl)-4-(β-aminopropyl)-aminoaniline is replaced by an equivalent amount of 3-(β-sulfoethylsulfonyl)-4-piperazinylaniline, affording the novel alkali metal salt of the compound of the formula (the respective β-sulfoethylsulfonyl group can also be bonded in the other ortho-position relative to the amino group, but is more likely to be present in the position indicated in the above formula).

This compound according to the invention has very good fiber-reactive dye properties. It dyes the materials mentioned in the description, in particular cellulose fiber materials, such as cotton, by the application and fixing methods known and customary in the art for fiber-reactive dyes in strong, pure greenish-blue shades having good fastness properties, such as in particular good light fastness of the dry or moist (such as tap water moistened) dyeing, good alkaline perspiration light fastness, chlorinated water fastness, hypochlorite fastness, alkaline perspiration fastness, wash fastness, even in the presence of perborates, wet storage fastness and acid fading resistance.

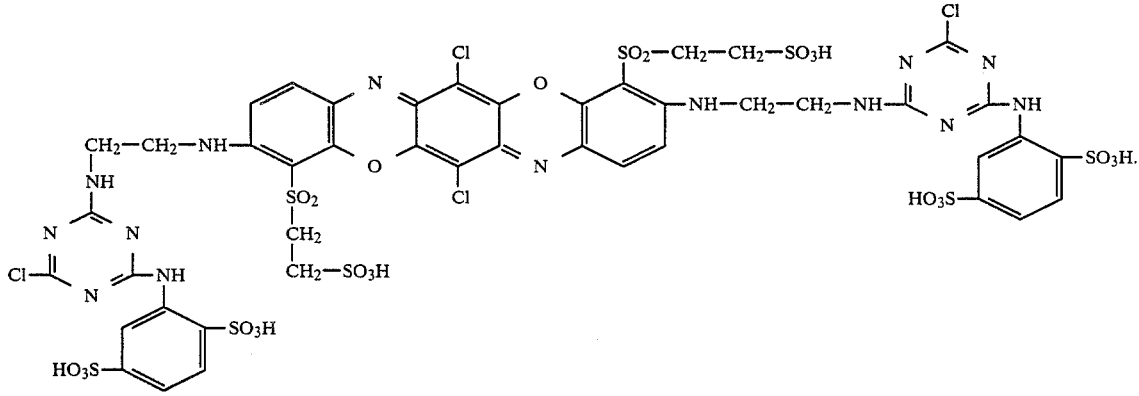

This compound according to the invention has very good fiber-reactive dyeing properties and produces on the fiber materials mentioned in the description, in particular on cellulose fiber materials, such as cotton fabric, by the application and fixing methods customary in the art for fiber-reactive dyes deep greenish blue dyeings

EXAMPLES 11 TO 41

The tabulated Examples below describe further triphendioxazine compounds according to the invention by means of formula members of the general formula (A) below. They can be prepared from the components evident therefrom in one of the procedures according to the invention, such as analogously to one of the procedures of the above worked Examples. They likewise have very good fiber-reactive dye properties and produce in particular on cellulose fiber materials storing dyeings and prints having good fastness properties in the hue indicated in the respective tabulated Example.

(A) — structure showing:

R*—N—W¹—NH—[phenyl with SO₂CH₂CH₂SO₃H]—N=[quinone with X, O, X]=N—[phenyl with SO₂—CH₂—CH₂—SO₃H]—NH—W²—N—R*, with triazine groups (N=C(Y)—N=C(Z)—N) at each R*—N terminus.

| Example | W¹ | W² | X | Z | R* | Radical Y | Hue |
|---|---|---|---|---|---|---|---|
| 11 | 3-HOOC-phenylene | 4-HOOC-phenylene | Cl | Cl | H | 3-(β-sulfatoethylsulfonyl)-phenylamino | greenish blue |
| 12 | 3-HO₃S-phenylene | 4-HO₃S-phenylene | Br | Cl | H | 4-(β-sulfatoethylsulfonyl)-phenylamino | greenish blue |
| 13 | 3-HO₃S-phenylene | 4-HO₃S-phenylene | Br | Cl | H | 4-methoxy-3-(β-sulfatoethylsulfonyl)-phenylamino | greenish blue |
| 14 | 3-HO₃S-phenylene | 4-HO₃S-phenylene | Cl | Cl | H | 4-(β-sulfatoethylsulfonyl)-phenylamino | greenish blue |
| 15 | 3-HO₃S-phenylene | 4-HO₃S-phenylene | Cl | Cl | H | 3-(β-sulfatoethylsulfonyl)-phenylamino | greenish blue |
| 16 | 3-HO₃S-phenylene | 4-HO₃S-phenylene | Cl | F | H | 3-sulfophenylamino | greenish blue |
| 17 | 3-HO₃S-phenylene | 4-HO₃S-phenylene | Cl | F | H | 4-(β-sulfatoethylsulfonyl)-phenylamino | greenish blue |
| 18 | 2,5-disulfo-phenylene | 2,5-disulfo-phenylene | Cl | Cl | H | 4-(β-sulfatoethylsulfonyl)-phenylamino | greenish blue |
| 19 | 2,5-disulfo-phenylene | 2,5-disulfo-phenylene | Cl | Cl | H | 3-(β-sulfatoethylsulfonyl)-phenylamino | greenish blue |

-continued (A)

Structure: A symmetrical dioxazine dye with two triazinyl end groups connected via -NH-W¹-NH- and -NH-W²-N(R*)- linkers to the central dioxazine chromophore bearing X substituents, SO₂-CH₂-CH₂-SO₃H group, and SO₂-CH₂-CH₂-SO₃H group; triazines bear Y and Z substituents.

| Example | W¹ | W² | X | Z | R* | Radical Y | Hue |
|---|---|---|---|---|---|---|---|
| 20 | 2,5-disubstituted benzene with SO₃H at 1,4 | 2,5-disubstituted benzene with SO₃H at 1,4 | Cl | Cl | H | 4-methoxy-3-(β-sulfatoethylsulfonyl)-phenylamino | greenish blue |
| 21 | benzene-1,4-diyl with HO₃S at 3 | benzene-1,4-diyl with SO₃H at 3 | Cl | Cl | H | 3-(β-sulfatoethylsulfonyl)-phenylamino | greenish blue |
| 22 | benzene-1,4-diyl with HO₃S at 3 | benzene-1,4-diyl with SO₃H at 3 | Cl | Cl | H | 4-methoxy-3-(β-sulfatoethylsulfonyl)-phenylamino | greenish blue |
| 23 | benzene-1,4-diyl with HO₃S at 3 | benzene-1,4-diyl with SO₃H at 3 | Cl | F | H | 4-sulfophenylamino | greenish blue |
| 24 | benzene-1,4-diyl with HO₃S at 3 | benzene-1,4-diyl with SO₃H at 3 | Cl | F | H | 3-sulfophenylamino | greenish blue |
| 25 | —CH₂—CH₂— | —CH₂—CH₂— | Cl | F | H | 2,4-disulfophenylamino | greenish blue |
| 26 | —CH₂—CH₂— | —CH₂—CH₂— | Cl | Cl | H | 4-[4'-(2",4"-disulfophenylamino)-2"-chloro-s-triazin-6-yl]-amino-2-sulfophenylamino | greenish blue |
| 27 | —CH₂—CH₂—CH₂— | —CH₂—CH₂—CH₂— | Cl | F | H | 2,4-disulfophenylamino | greenish blue |
| 28 | —CH₂—CH₂—CH₂— | —CH₂—CH₂—CH₂— | Cl | Cl | H | 3-sulfophenylamino | greenish blue |
| 29 | —(CH₂)₂—O—(CH₂)₂— | —(CH₂)₂—O—(CH₂)₂— | Cl | Cl | H | 2,4-disulfophenylamino | greenish blue |
| 30 | —CH₂—CH₂— | —CH₂—CH₂— | Cl | Cl | cyclohexyl | 2-sulfo-5-(β-sulfatoethylsulfonyl)-phenylamino | greenish blue |
| 31 | —CH(CH₃)—CH₂— | —CH₂—CH(CH₃)— | Cl | F | H | 2,5-disulfophenylamino | greenish blue |
| 32 | —CH(CH₃)—CH₂— | —CH₂—CH(CH₃)— | Cl | Cl | H | 4-[4'-(3"-sulfophenylamino)-2"-chloro-s-triazin-6-yl]-amino-2,5-disulfophenylamino | greenish blue |
| 33 | —CH₂—CH₂— | —CH₂—CH₂— | Cl | Cl | cyclohexyl | 2,4-disulfophenylamino | greenish blue |
| 34 | —CH₂—CH₂—CH₃ (on CH) | —CH₂—CH(CH₃)— | Cl | Cl | H | 2-sulfo-5-(β-sulfatoethylsulfonyl)-phenylamino | greenish blue |

-continued

Formula (A):

$$R^*-N-W^1-NH-\text{Ar}-N=\text{(dioxazine core with X, O, SO}_2\text{CH}_2\text{CH}_2\text{SO}_3\text{H)}-NH-W^2-N-R^*$$

(triphendioxazine structure with two triazinyl groups bearing Y, Z substituents)

| Example | W¹ | W² | X | Z | R* | Radical Y | Hue |
|---|---|---|---|---|---|---|---|
| 35 | —CH₂—CH(OSO₃H)—CH₂— | —CH₂—CH(OSO₃H)—CH₂— | Cl | Cl | H | 4-(β-sulfatoethylsulfonyl)-phenylamino | greenish blue |
| 36 | the radicals —(R*)N—W¹— and —W²—N(R*)— each form a direct bond | | Cl | Cl | — | 3-sulfophenylamino | reddish blue |
| 37 | 3-sulfophenylene (HO₃S) | 4-sulfophenylene (SO₃H) | Cl | F | H | 2,5-disulfophenylamino | greenish blue |
| 38 | 3-sulfophenylene | 4-sulfophenylene | Cl | Cl | H | 2-sulfo-5-(β-sulfatoethylsulfonyl)-phenylamino | greenish blue |
| 39 | 3-sulfophenylene | 4-sulfophenylene | Cl | Cl | H | β-(4-β'-sulfatoethylsulfonylphenyl)-ethylamino | greenish blue |
| 40 | 3-sulfophenylene | 4-sulfophenylene | Cl | Cl | H | 4-methyl-3-(β-sulfatoethylsulfonyl)-phenylamino | greenish blue |
| 41 | 3-carboxyphenylene (HOOC) | 4-carboxyphenylene (COOH) | Cl | Cl | H | 4-(β-sulfatoethylsulfonyl)-phenylamino | greenish blue |

EXAMPLE 42

(a) 118 parts of 3-methylsulfonyl-4-chloronitrobenzene and 130 parts of 1,4-diaminobenzene-2-sulfonic acid are suspended in 800 parts of water while setting a pH value of 7. 16 parts of magnesium oxide are added, and the reaction mixture is then refluxed for eight hours. After cooling down to room temperature, the precipitated sodium salt of 3-methylsulfonyl-4-(4'-amino-3'-sulfophenylamino)-nitrobenzene is filtered off with suction and dried.

It has the following ¹H-NMR data (in D₆-dimethyl sulfoxide, using tetramethylsilane as internal standard): δ=3.32 ppm (s,3H), 5.75 ppm (s,NH), 6.67 ppm (d,1H), 6.77 ppm (d,1H), 6.88 ppm (dd,1H), 7.35 ppm (d,1H), 8.20 ppm (dd,1H), 8.47 ppm (d,1H).

(b) 164 parts of the nitro compound of (a) are suspended in 500 parts of water and are hydrogenated in an autoclave at a temperature between 60° and 80° C. and under a hydrogen pressure of 50 bar in the presence of a nickel catalyst. The catalyst is subsequently filtered off, and the product is salted out from the filtrate by means of potassium chloride (added in an amount of 15%, based on the volume of the filtrate).

The potassium salt of 3-methylsulfonyl-4-(4'-amino-3'-sulfophenylamino)-aniline has the following ¹H-NMR data (in D₆-dimethyl sulfoxide, using TMS as internal standard): δ=3.14 ppm (s,3H), 5.19 ppm (s,NH), 6.57 ppm (d,1H), 6.67 ppm (s,NH), 6.78 pp (m,3H), 7.03 ppm (d,1H), 7.10 ppm (d,1H).

(c) 17.9 of the amino compound of (b) and 6.2 parts of 2,3,5,6-tetrachloro-1,4-benzoquinone are suspended at pH 6 in 100 parts of water. The batch is heated to 60° C. and is maintained for three hours at this temperature and, by means of sodium hydrogencarbonate, at pH 6. The precipitated quinoidal intermediate is then filtered off with suction and dried. 14 parts of this product are added at 20° C. to 160 parts of 15% strength oleum in the course of 20 minutes. The batch is stirred at 20° C. for 15 hours and is then discharged onto 800 parts of ice. The precipitated triphendioxazine compound is filtered off with suction and is dissolved in 200 parts of water with sodium carbonate to give a neutral solution ($\lambda_{max}$=620 nm).

(d) 200 parts of the neutral solution of the triphendioxazine compound obtained in (c) are treated with 5 parts of 3-(β-chloroethylsulfonyl)-benzoyl chloride; the batch is stirred at room temperature and at a pH value of 7 for four hours, a pH value of 7 being maintained with sodium hydrogencarbonate. The synthesized triphendioxazine compound according to the invention is then salted out with sodium chloride, filtered off with suction, mixed with a phosphate buffer (pH about 5) and dried at 50° C. under reduced pressure.

The compound according to the invention, written in the form of the free acid, has the presumable structure of the formula

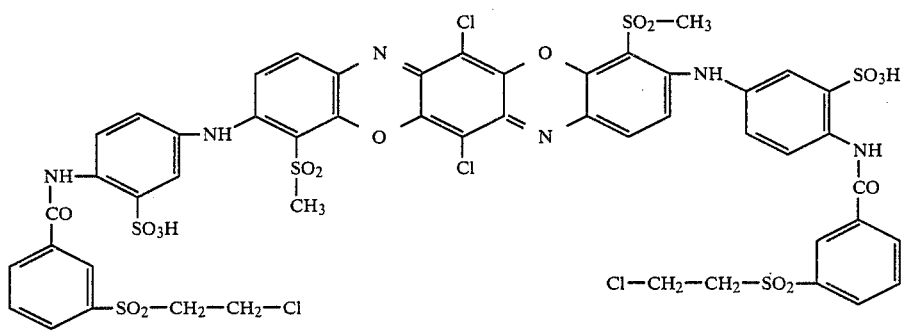

($\lambda_{max}$ = 616 nm).

This compound according to the invention has very good fiber-reactive dye properties. It dyes the materials mentioned in the description, in particular cellulose fiber materials, such as cotton, by the application and fixing methods customary and known in the art for fiber-reactive dyes in strong, sky blue shades having fastness properties, such as in particular good light fastness of the dry or moist dyeing, such as tap water moistened or moistened with an alkaline sweat solution, hypochlorite fastness, alkaline perspiration fastness, wash fastness, even in the presence of perborates, and wet storage fastness.

EXAMPLE 43

(a) To synthesize a triphenoxazine compound according to the invention, first a precursor according to the invention, namely 3-methylsulfonyl-4-(3'-amino-4'-sulfophenylamino)-aniline, is synthesized by repeating the procedure of Example 42 (a) and (b), except that the 1,4-diaminobenzene-2-sulfonic acid is replaced by an equivalent amount of 1,3-diaminobenzene-4-sulfonic acid. The compound obtained has the following $^1$H-NMR data (in D$_6$-dimethyl sulfoxide, using TMS as internal standard): δ=3.04 ppm (s,3H), 5.45 ppm, (s,NH), 5.95 ppm (d,1H) 6.01 ppm (d,1H), 6.82 ppm (s,NH), 6.85 ppm (d,1H), 7.09 ppm (d,1H), 7.10 ppm (d,1H), 7.22 ppm (d,1H).

(b) The aniline compound of (a) is initially condensed analogously to the directions of Example 42 (c) with chloranil to give the quinoidal intermediate, and this quinoidal intermediate is then cyclized in oleum to give a triphendioxazine compound which has an absorption maximum at 613 nm in aqueous solution and has the following $^1$H-NMR data (in D$_6$-dimethyl sulfoxide, using TMS as internal standard): δ=3.51 ppm (s,6H), 5.82 ppm (s,NH), 6.55 ppm (s,2H), 7.06 ppm (d,2H), 7.50 ppm (d,2H), 7.90 ppm (s,2H), 9.70 ppm (s,NH).

The cyclization reaction is accompanied by a sulfonation so that the resulting intermediate triphendioxazine compound can be assigned the following structure:

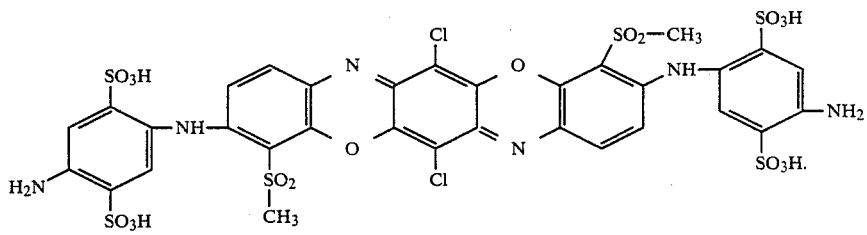

(c) To synthesize the triphendioxazine compound according to the invention, Example 42(d) is repeated by reacting with 3-(β-chloroethylsulfonyl)-benzoyl chloride. The triphendioxazine compound according to the invention is isolated in the conventional manner and, written in the form of the free acid, has the following structure:

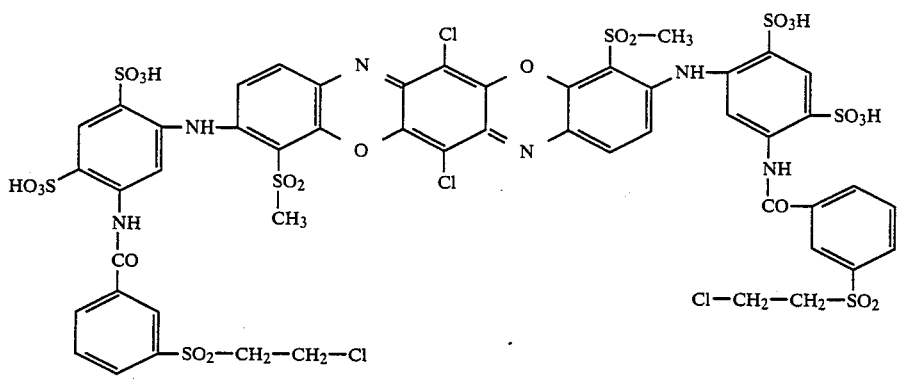

($\lambda_{max}$ = 590 nm).

This compound according to the invention has very good fiber-reactive dye properties. It dyes the materials mentioned in the description, in particulr cellulose fiber materials, such as cotton, by the application and fixing methods known and customary in the art for fiber-reactive dyes in strong, sky blue shades having good fastness properties, such as, in particular, good light fastness of the dry or moist (such as tap water moistened) dyeing, good alkaline perspiration light fastness, hypochlorite fastness, alkaline perspiration fastness, wash fastness, even in the presence of perborates, and wet storage fastness.

EXAMPLE 44

6 parts of 4-(β-sulfatoethylsulfonyl)-aniline are dissolved in 50 parts of water at pH 5 and added to a suspension of 3.8 parts of cyanuric chloride in 30 parts of water; the reaction mixture is stirred at a temperature between 10 and 15° C. and at pH 5 (maintained by means of sodium carbonate) until the condensation reaction has ended. 300 parts of the neutral triphendioxazine compound solution prepared in Example 42 c) are then added; the batch is subsequently stirred for a further three hours at a pH of 5.5 and a temperature of 35° C. and thereafter for a further two hours at a pH value of 5.5 and a temperature of 50° C.

The triphendioxazine compound according to the invention is precipitated at room temperature out of the synthesis solution by means of sodium chloride or isolated by spray-drying the synthesis solution.

The compound according to the invention, written in the form of the free acid, has the presumable structure of the formula

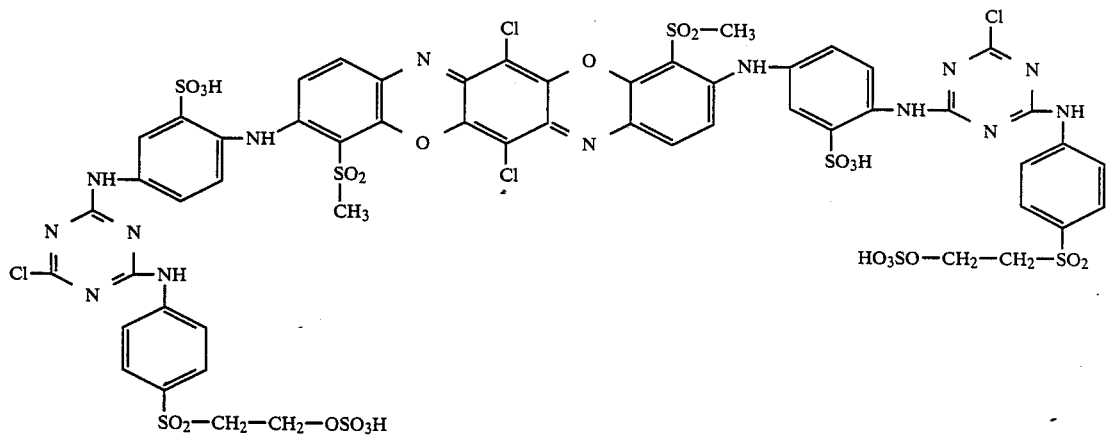

($\lambda_{max}$ = 612 nm).

This compound according to the invention has very good fiber-reactive dye properties. It dyes the materials mentioned in the description, in particular cellulose fiber materials, such as cotton, by the application and fixing methods known and customary in the art for fiber-reactive dyes in strong, sky blue shades having good fastness properties, such as in particular good light fastness of the dry or moist (such as tap water moistened) dyeing, good alkaline perspiration light fastness, hypochlorite fastness, alkaline perspiration fastness, wash fastness, wet storage fastness and acid fading resistance.

EXAMPLES 45 TO 49

The tabulated Examples below describe further triphendioxazine compounds according to the invention by means of the formula members of the general formula (B) below. They can be prepared from the components evident therefrom in one of the methods according to the invention, such as analogously to one of the methods of the above worked Examples. They likewise have very good fiber-reactive dye properties and produce in particular on cellulose fiber materials strong dyeings and prints having good fastness properties in the hue indicated in the respective tabulated Example.

| Example | W¹ | W² | Radical Z | Hue |
|---------|-----|-----|-----------|------|
| 45 | HO₃S—⟨phenyl⟩— | —⟨phenyl⟩—SO₃H | bis-{N,N—[β-(β'-chloroethyl-sulfonyl)-ethyl]}-amino | greenish blue |
| 46 | HO₃S—⟨phenyl⟩—SO₃H | HO₃S—⟨phenyl⟩—SO₃H | bis-{N,N—[β-(β'-chloroethyl-sulfonyl)-ethyl]}-amino | greenish blue |
| 47 | HO₃S—⟨phenyl⟩—SO₃H | HO₃S—⟨phenyl⟩—SO₃H | 4-(β-sulfatoethylsulfonyl)-phenylamino | greenish blue |
| 48 | HO₃S—⟨phenyl⟩— | —⟨phenyl⟩—SO₃H | 3-(β-sulfatoethylsulfonyl)-phenylamino | greenish blue |
| 49 | HO₃S—⟨phenyl⟩—SO₃H | HO₃S—⟨phenyl⟩—SO₃H | 3-(β-sulfatoethylsulfonyl)-phenylamino | greenish blue |

We claim:

1. A water-soluble triphendioxazine compound of the formula

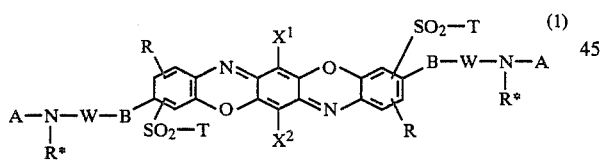

in which:

T is alkyl of 1 to 6 C-atoms unsubstituted by 1 or 2 substitutuents selected from the group consisting of chlorine, alkoxy of 1 to 4 C-atoms, alkanoylamino of 2 to 5 C-atoms, cyano, sulfato, phosphato, acetyloxy, sulfo, carboxy, phenyl and naphthyl, the phenyl and naphthyl each being unsubstituted or substituted by substituents selected from the group consisting of alkyl of 1 to 4 C-atoms, alkoxy of 1 to 4 C-atoms, halogen, sulfo, carboxy, sulfamoyl, carboamoyl, carboamoyl mono- or disubstituted by substituents selected from the group consisting of phenyl, alkyl of 1 to 4 C-atoms, phenylakyl with alkyl of 1 to 4 C-atoms and cycloalkyl of 5 to 8 C-atoms, sulfamoyl mono- or disubstituted by substituents selected from the group consisting of phenyl, alkyl of 1 to 4 C-atoms, phenylalkyl with alkyl of 1 to 4 C-atoms and cycloalkyl of 5 to 8 C-atoms, trifluoromethyl, alkanoylamino of 2 to 5 C-atoms, nitro, amino and amino mono- or disubstituted by substituents selected from the group consisting of alkyl of 1 to 6 C-atoms, phenyl, naphthyl and cycloalkyl of 5 to 8 C-atoms, and the alkyl group T is interrupted or is not interrupted by hetero groups selected from groups consisting of —O—, —S—, —NH—and —N(R')—in which R' is alkyl of 1 to 6 C-atoms unsubstituted or substituted by one or two substituents selected from the group consisting of chlorine, alkoxy of 1 to 4 C-atoms, alkanoylamino of 2 to 5 C-atoms, cyano, sulfato, phosphato, acetyloxy, sulfo, carboxy, phenyl and naphthyl, with the proviso that T, as a substituted alkyl, is not an ethyl group which is substituted in the β-position by a substituent which is eliminated by an alkali, or T is phenyl or naphthyl, or phenyl or naphthyl each substituted by substituents selected from the group consisting of alkyl or 1 to 4 C-atoms, alkoxy of 1 to 4 C-atoms, halogen, sulfo, carboxy, sulfamoyl, carbamoyl, carboamoyl mono- or disubstituted by substituents selected from the group consisting of phenyl, alkyl of 1 to 4 C-atoms, phenylalkyl with alkyl of 1 to 4 C-atoms and cycloalkyl of 5 to 8 C-atoms, sulfamoyl mono- or disubstituted by substituents selected from the group consisting of phenyl, alkyl of 1 to 4 C-atoms, phenylalkyl with alkyl of 1 to 4 C-atoms and cycloalkyl of 5 to 8 C-atoms, trifluoromethyl, alkanoylamino of 2 to 5 C-atoms, nitro, amino and amino mono- or disubstituted by substituents selected from the group consisting of alkyl of 1 to 6 C-atoms, phenyl, naphthyl nad cycloalkyl of 5 to 8 C-atoms;

B is oxygen or sulfur or a group of the formula —NH— or —N(R")— in which R" is alkyl of 1 to 6 C-atoms unsubstituted or substituted by 1 or 2 substituents selected from the group consisting of chlorine, alkoxy of 1 to 4 C-atoms, alkanoylamino of 2 to 5 C-atoms, cyano, sulfato, phosphato, acetyloxy, sulfo, carboxy, aryl unsubstituted or substituted by carboxy or sulfo, and cycloalkyl of 5 to 8 C-atoms, or B forms together with W a direct covalent bond;

W forms together with B a direct covalent bond or

W is phenylene or naphthylene, or phenylene or naphthylene substituted by substituents selected from the group consisting of alkyl of 1 to 4 C-atoms, alkoxy of 1 to 4 C-atoms, halogen, sulfo, carboxy, sulfamoyl, carboamoyl, carbamoyl mono- or disubstituted by substitutents selected from phenyl, alkyl of 1 to 4 C-atoms, phenylakyl having an alkyl of 1 to 4 C-atoms and cycloalkyl of 5 to 8 C-atoms, sulfamoyl mono- or disubsitituted by phenyl, alkyl of 1 to 4 C-atoms, phenylakyl having an alkyl of 1 to 4 C-atoms and cycloakyl of 5 to 8 C-atoms, trifluoromethyl, alkanoylamino of 2 to 5 C-atoms and nitro;

R is hydrogen or alkyl of 1 to 4 C-atoms or alkoxy of 1 to 4 C-atoms or halogen;

R* is hydrogen or alkyl of 1 to 4 C-atoms unsubstituted or substituted by 1 or 2 substituents selected from the group consisting of chlorine, alkoxy of 1 to 4 C-atoms, alkanoylamino of 2 to 5 C-atoms, cyano, sulfato, phosphato, acetyloxy, sulfo, carboxy, aryl unsubstituted or substituted by carboxy or sulfo, and cycloalkyl of 5 to 8 C-atoms, or is cycloalkyl of 5 to 8 C-atoms, or R* and R° form together with both nitrogen atoms and with W or a part of W a 5- or 6-membered saturated heterocyclic ring;

A is a non-heterocyclic fiber-reactive group selected from β-chloropropionyl, 3-(β-chloroethylsulfonyl)-benzoyl and 2-fluoro-2-chloro-3,3-difluoro-cyclobutane-1-carbonyl, or A is a group of the general formula

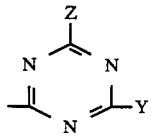  (2)

in which

Z is chlorine and

Y is an amino group of the formula

  (3a)

in which $R^1$ is hydrogen or alkyl or 1 to 4 C-atoms unsubstituted or substituted by 1 or 2 substituents selected from the group consisting of: alkoxy of 1 to 4 C-atoms; chlorine; cyano; carboxy; sulfo; sulfato; phosphato; hydroxy; phenyl unsubstituted or substituted by 1, 2 or 3 substitutents selected from the set of groups consisting of 3 alkyl groups of 1 to 4 C-atoms, 2 alkoxy groups of 1 to 4 C-atoms, 1 bromine atom, 2 chlorine atoms, 2 sulfo groups and 1 carboxy group; naphthyl unsubstituted or substituted by 1, 2 or 3 sulfo groups; and 1 group of the formula (4a), (4b), (5a) or (5b)

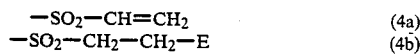 (4a)
(4b)

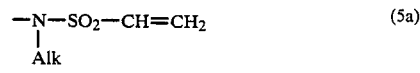 (5a)

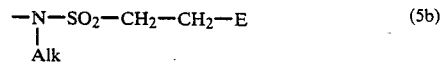 (5b)

in which

E is a substituent which is eliminated by means of an alkali, and

Alk is hydrogen or alkyl of 1 to 4 C-atoms, or $R^1$ is cycloalkyl of 5 to 8 C-atoms, and $R^2$ is hydrogen or alkyl of 1 to 4 C-atoms unsubstituted or substituted by 1 or 2 substituents selected from the group consisting of: alkoxy of 1 to 4 C-atoms; chlorine; cyano; carboxy; sulfo; sulfato; phosphato; hydroxy; phenyl unsubstituted or substituted by 1, 2 or 3 substitutents selected from the set of groups consisting of 3 alkyl groups of 1 to 4 C-atoms, 2 alkoxy groups of 1 to 4 C-atoms, 1 bromine atom, 2 chlorine atoms, 2 sulfo groups and 1 carboxy group; naphthyl unsubstituted or substituted by 1, 2 or 3 sulfo groups; and 1 group of the formula (4a), (4b), (5a) or (5b) defined above, or $R^2$ is cycloalkyl of 5 to 8 C-atoms, or is phenyl unsubstituted or substituted by 1 , 2 or 3 substituents selected from the set consisting of 3 alkyl groups of 1 to 4 C-atoms, 2 alkoxy groups of 1 to 4 C-atoms, 1 bromine atom, 2 chlorine atoms, 2 sulfo groups, 1 carboxy group and 1 group of the formula (4a), (4b), (5a) or (5b) mentioned and defined above, or is naphthyl unsubstituted or substituted by 1, 2 or 3 substituents selected from the set consisting of 2 sulfo groupos and 1 groups and 1 group fo the formula (4a), (4b), (5a) or (5b) mentioned and defined above, at least one of those substituents in $R^1$ and $R^2$ is mandatorily a group of the above-mentioned formulae (4a), (4b), (5a) and (5b), or $R^1$ and $R^2$ form together with the N-atom the group piperidino, morpholino or piperazino;

$X^1$ is hydrogen, halogen, cycloalkyl of 5 to 8 C-atoms, aralkoxy, alkoxy of 1 to 4 C-atoms, aryloxy, alkyl of 1 to 4 C-atoms, aryl, aralkyl, cyano, carboxy, carbalkoxy of 2 to 5 C-atoms, arylamino, carboamoyl, N-alkyl-carbamoyl with alkyl of 1 to 4 C-atoms, N,N-dialkyl-carboamoyl with alkyl each of 1 to 4 C-atoms, N-aryl-carbamoyl, alkanoylamino of 2 to 5 C-atoms or arylamino, the mentioned aryls in the mentioned groups being unsubstituted or substittued by 1 or 2 substituents selected from the group consisting of halogen, nitro, alkyl of 1 to 4 C-atoms, alkoxy of 1 to 4 C-atoms, carboxy and sulfo;

$X^2$ is identical to or different from $X^1$ and has one of the meanings indicated for $X^1$;

at least one of the groups selected from sulfo and sulfato, which may be present according to the above definitions, is mandatorily present in the triphenodioxazine compound.

2. A triphendioxazine compound as claimed in claim 1 of the formula (1b)

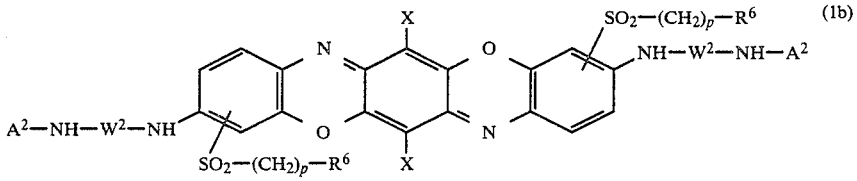

in which
X is in each case a bromine atom or a chlorine atom,
p stands for the number 2 or 3,
$R^6$ deontes a sulfato, carboxy or sulfo group, but in the case of p=2 $R^6$ is not a sulfato group, or the group $-(CH_2)_p-R^6$ is the methyl group,
$W^2$ denotes the p-phenylene radical which is unsubstituted or substituted by 1 or 2 sulfo groups and $A^2$ denotes a trazine radical of the formula (2) in which Z stands for the chlorine atom and Y denotes a radical of the formula (7)

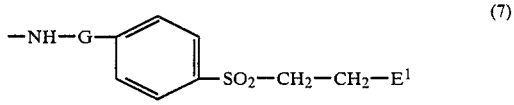

in which G stands for the methylene or 1,2-ethylene group or a direct bond and $E^1$ is a chlorine atom, a phosphato, acetyloxy or thiosulfato group or sulfato group.

3. A compound as claimed in claim 1 of the formula

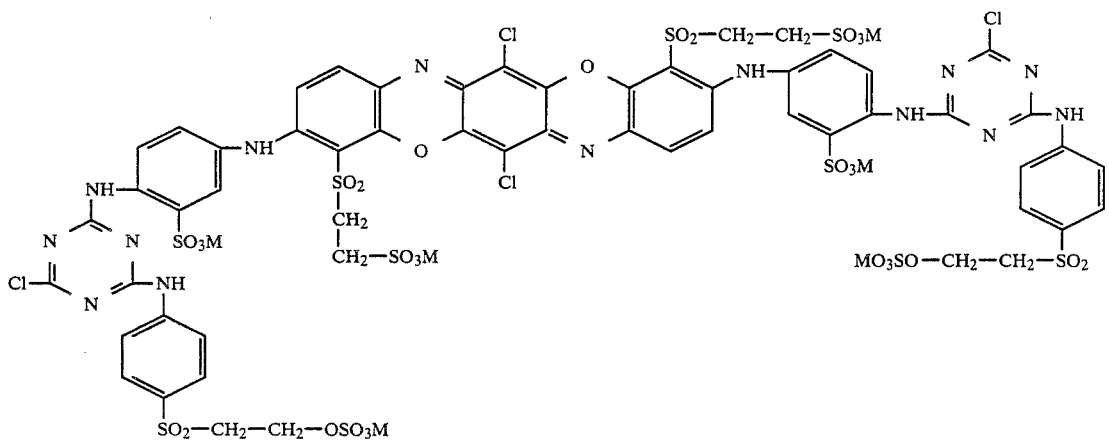

in which M is a hydrogen atom or an alkali metal.

4. A compound as claimed in claim 1, wherein $X^1$ and $X^2$ or both each are chlorine.

5. A compound according to claim 2, wherein both X are chlorine.

6. A compound as claimed in claim 1, wherein T is the β-sulfoethyl or the methyl group.

* * * * *

UNITED STATES PATENT AND TRADEMARK OFFICE
CERTIFICATE OF CORRECTION

PATENT NO. : 4,785,099

DATED : November 15, 1988

INVENTOR(S) : Hartmut Springer, Gunther Schwaiger, and Walter Helmling

It is certified that error appears in the above-identified patent and that said Letters Patent is hereby corrected as shown below:

In column 39, line 52 (claim 1), insert the words --or substituted-- after the word "unsubstituted".

Signed and Sealed this

Fourth Day of July, 1989

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,785,099
DATED : November 15, 1988
INVENTOR(S) : Hartmut Springer, Gunther Schwaiger and Walter Helmling It is certified that error appears in the above-indentified patent and that said Letters Patent is hereby corrected as shown below:

In column 42, line 49, should read --sulfo groups and 1 group of the --.

Signed and Sealed this

Thirteenth Day of July, 1993

Attest:

MICHAEL K. KIRK

Attesting Officer     Acting Commissioner of Patents and Trademarks